US012660012B2

(12) United States Patent
Chan et al.

(10) Patent No.: US 12,660,012 B2
(45) Date of Patent: Jun. 16, 2026

(54) METHODS AND SYSTEMS FOR DATA COMMUNICATION AT A PRIMARY WIRELESS COMMUNICATION APPARATUS IN CONJUNCTION WITH AN AUXILIARY WIRELESS COMMUNICATION APPARATUS

(71) Applicant: Pismo Labs Technology Limited, Kowloon (HK)

(72) Inventors: Alex Wing Hong Chan, Tai Tam (HK); Yu Yeung, Kowloon (HK); King Shan Lam, Shatin (HK)

(73) Assignee: Pismo Labs Technology Limited, Kowloon (HK)

( * ) Notice: Subject to any disclaimer, the term of this patent is extended or adjusted under 35 U.S.C. 154(b) by 3 days.

(21) Appl. No.: 18/479,067

(22) Filed: Oct. 1, 2023

(65) Prior Publication Data

US 2025/0113172 A1      Apr. 3, 2025

Related U.S. Application Data

(63) Continuation of application No. 18/553,562, filed as application No. PCT/IB2022/057590 on Aug. 13, 2022, now Pat. No. 12,526,854.

(51) Int. Cl.
*H04W 76/14* (2018.01)
*H04W 8/18* (2009.01)
(Continued)

(52) U.S. Cl.
CPC ............. *H04W 76/10* (2018.02); *H04W 8/18* (2013.01); *H04W 8/183* (2013.01); *H04W 8/20* (2013.01);
(Continued)

(58) Field of Classification Search
CPC .......... H04W 40/22; H04W 8/18; H04W 8/20
See application file for complete search history.

(56) References Cited

U.S. PATENT DOCUMENTS

| | | | | |
|---|---|---|---|---|
| 7,912,504 B2 * | 3/2011 | Bjorkner | ............... | H04W 8/205 |
| | | | | 455/445 |
| 9,735,821 B2 * | 8/2017 | Vecera | .................. | H04M 15/61 |

(Continued)

FOREIGN PATENT DOCUMENTS

| | | | |
|---|---|---|---|
| CN | 102841805 A | | 12/2012 |
| CN | 103731937 A | * | 4/2014 |

(Continued)

OTHER PUBLICATIONS

Machine language translation of CN 103731937 A (Year: 2014).*
(Continued)

*Primary Examiner* — William G Trost, IV
(74) *Attorney, Agent, or Firm* — Hershkovitz & Associates, PLLC; Abe Hershkovitz

(57) ABSTRACT

The present invention discloses methods and systems for data communication at a primary wireless communication apparatus (WCA) in conjunction with an auxiliary WCA. The primary and the auxiliary WCAs may be connected and each houses at least one subscriber identification module (SIM). When a data packet is to be sent using the primary WCA, a wireless communication module (WCM) of the primary WCA is used. When a data packet is to be sent using the auxiliary WCA, a WCM of the auxiliary WCA is used. When receiving a data packet, the data packet is processed based on the receiving WCA. When a data packet is received through the WCM of the primary WCA, the data packet is processed at the primary WCA. When a data packet is received through the WCM of the auxiliary WCA, the data packet is first sent to the primary WCA and then processed.

20 Claims, 19 Drawing Sheets

(51) Int. Cl.

| | |
|---|---|
| *H04W 8/20* | (2009.01) |
| *H04W 24/08* | (2009.01) |
| *H04W 76/10* | (2018.01) |
| *H04W 88/04* | (2009.01) |

(52) U.S. Cl.
CPC ........... *H04W 24/08* (2013.01); *H04W 76/14* (2018.02); *H04W 88/04* (2013.01)

(56) References Cited

U.S. PATENT DOCUMENTS

| | | | | |
|---|---|---|---|---|
| 9,860,833 | B2 * | 1/2018 | Khay-Ibbat | ........... H04W 72/51 |
| 10,015,658 | B1 | 7/2018 | Alfaro et al. | |
| 10,834,572 | B2 * | 11/2020 | Chughtai | .............. H04W 12/42 |
| 11,388,599 | B2 * | 7/2022 | Liu | ........................ H04W 8/205 |
| 2002/0198652 | A1 | 12/2002 | Hirayama et al. | |
| 2008/0081611 | A1 * | 4/2008 | Hoyt | ................. H04W 12/0471 |
| | | | | 455/425 |
| 2009/0061932 | A1 * | 3/2009 | Nagarajan | ............. H04M 1/724 |
| | | | | 455/558 |
| 2011/0038432 | A1 * | 2/2011 | Potkonjak | ......... H04W 52/0225 |
| | | | | 375/260 |
| 2015/0350878 | A1 * | 12/2015 | Li | ......................... H04W 8/183 |
| | | | | 455/558 |
| 2016/0037329 | A1 * | 2/2016 | Chong | ................. G09G 3/3291 |
| | | | | 455/422.1 |
| 2016/0080933 | A1 * | 3/2016 | Sarkhel | ............. H04M 1/72454 |
| | | | | 455/558 |
| 2016/0190850 | A1 * | 6/2016 | Jeganathan | ......... H02J 7/00047 |
| | | | | 320/108 |
| 2017/0031859 | A1 * | 2/2017 | Igarashi | .............. G06F 13/4081 |
| 2017/0303258 | A1 * | 10/2017 | Zhang | .............. H04W 72/0453 |
| 2018/0014239 | A1 * | 1/2018 | Chau | ......................... H04L 1/18 |
| 2018/0310236 | A1 * | 10/2018 | Kumar | .................... H04W 8/18 |
| 2019/0141508 | A1 | 5/2019 | Alfaro et al. | |
| 2020/0359211 | A1 * | 11/2020 | Liu | ........................ H04W 12/43 |
| 2021/0360385 | A1 * | 11/2021 | Kwan | .................... H04W 8/20 |
| 2024/0236643 | A1 * | 7/2024 | Kwan | .................. H04W 12/42 |

FOREIGN PATENT DOCUMENTS

| | | | | | |
|---|---|---|---|---|---|
| EP | | 4294063 | A1 * | 12/2023 | ............ H04W 12/43 |
| WO | WO-2013017733 | A1 * | 2/2013 | .............. H04W 8/20 |
| WO | WO-2017109546 | A1 * | 6/2017 | .............. H04L 1/18 |
| WO | WO-2022206616 | A1 * | 10/2022 | ............ H04W 12/43 |

OTHER PUBLICATIONS

Machine language translation of WO 2022206616 A1 (Year: 2022).*
English Language Abstract of CN102841805A (Dec. 26, 2012).
International Search Report in International Application No. PCT/IB2022/057590, mailed on May 15, 2023.
Written Opinion of the International Searching Authority in International Application No. PCT/IB2022/057590, mailed on May 15, 2023.

* cited by examiner

701

At the primary WCA, establishing a
connection with an auxiliary WCA

702

At the primary WCA, communicating
to an interconnected networks

703

At the auxiliary
WCA, is a first
criterion met?

No

705

Performing a second action

Yes

704

Performing a first action

801

At a certain time interval,
receiving power level information of a
first battery unit housed at the primary
WCA

802

Is the power level
below a power
level threshold?

No

Yes

803

Instructing an auxiliary WCA to provide
power from a second battery unit housed
at the auxiliary WCA

804

Receiving power from the second
battery unit

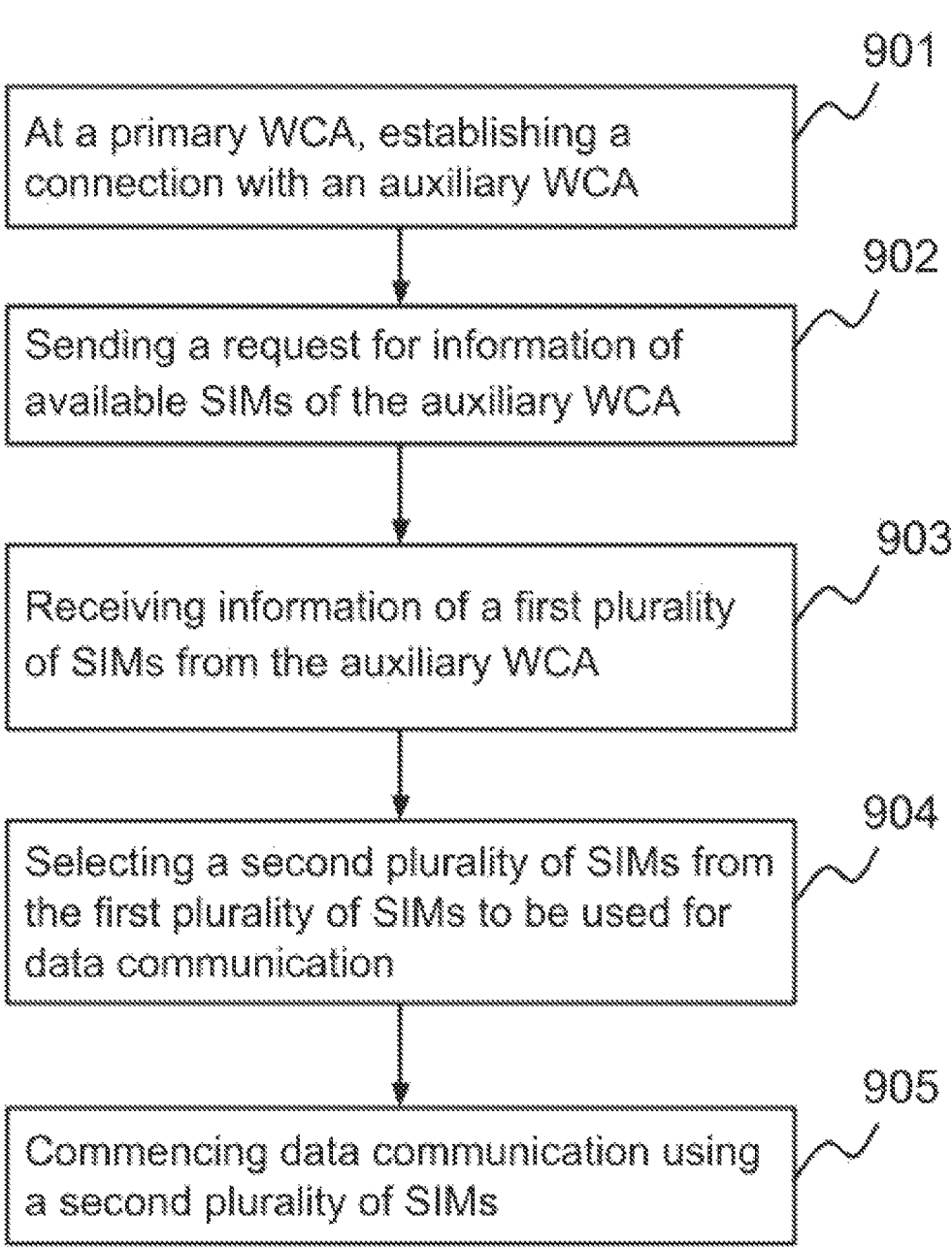

901

At a primary WCA, establishing a connection with an auxiliary WCA

902

Sending a request for information of available SIMs of the auxiliary WCA

903

Receiving information of a first plurality of SIMs from the auxiliary WCA

904

Selecting a second plurality of SIMs from the first plurality of SIMs to be used for data communication

905

Commencing data communication using a second plurality of SIMs

FIG. 9

METHODS AND SYSTEMS FOR DATA COMMUNICATION AT A PRIMARY WIRELESS COMMUNICATION APPARATUS IN CONJUNCTION WITH AN AUXILIARY WIRELESS COMMUNICATION APPARATUS

RELATED APPLICATIONS

This patent application is a Non-Provisional Continuation Application, which claims the benefits of and is based on U.S. application Ser. No. 18/553,562 filed on Oct. 1, 2023, which is a 371 National Stage entry of Patent Cooperation Treaty Application No. PCT/IB2022/057590, filed on Aug. 13, 2022, and is related to U.S. application Ser. No. 18/479,066 and U.S. application Ser. No. 18/479,068, both filed on Oct. 1, 2023, the disclosures of which are hereby incorporated by specific reference thereto.

TECHNICAL FIELD

The present invention generally relates to the field of cellular data communication, and more particularly, to methods and systems for high-speed data communication at a primary wireless communication apparatus (WCA) using a plurality of data connections realized using an auxiliary WCA housing at least one subscriber identification module (SIM).

BACKGROUND ART

Usage of cellular data, led by the diversified features and benefits that come along with this technology, has become the most common and popular form of data communication nowadays. Although there is no limitation on the hardware or devices that are used to utilize cellular data-mobile phones, cellular routers, wireless routers, wireless modems, laptops, and tablets are found as the most common hardware or devices used by users to utilize cellular data. Among the aforementioned devices, mobile phones, more specifically, smartphones are by far the most common devices that are used to realize cellular data communication.

However, when conducting cellular data communication for the purposes of high speed and vast data communication, a mobile phone is limited to the use of its wireless communication technologies.

SUMMARY OF THE INVENTION

One exemplary embodiment of the present invention discloses methods and systems for data communication at a primary wireless communication apparatus (WCA) in conjunction with an auxiliary WCA. The primary WCA is connected to the auxiliary WCA, and the auxiliary WCA may house at least one SIM. In a first scenario, a processing unit of the primary WCA determines whether to send a data packet using the primary WCA or the auxiliary WCA. When the data packet is to be sent using the primary WCA, the data packet is sent using a wireless communication module (WCM) of the primary WCA. When the data packet is to be sent using the auxiliary WCA, the data packet is sent using a WCM of the auxiliary WCA.

In a second scenario, when a data packet is received at the primary WCA through the WCM of the primary WCA, the data packet is processed by the processing unit of the primary WCA. On the other hand, when the data packet is received through the WCM of the auxiliary WCA, the data packet is first sent to the primary WCA and then processed by the processing unit of the primary WCA.

The auxiliary WCA may also be used to perform computing, communication, and monitoring functions that the first WCA is not equipped to perform or is not able to perform.

BRIEF DESCRIPTION OF THE DRAWINGS

The disclosure will be readily understood by the following detailed description in conjunction with the accompanying drawings, wherein like reference numerals designate like structural elements, and in which:

FIG. 9 is a process flowchart illustrating a method for receiving information, by a primary WCA, of available SIMs from an auxiliary WCA and selecting a plurality of SIMs for data communication.

DESCRIPTION OF EMBODIMENTS

Figure 1A:
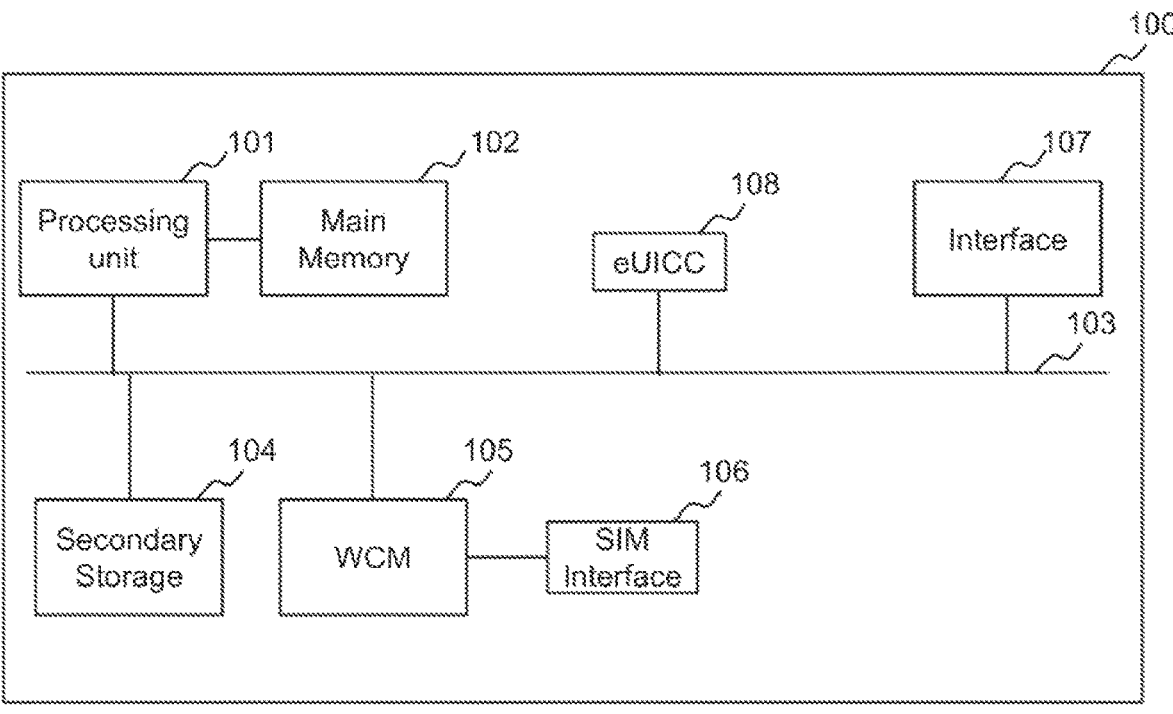
FIG. 1A is a schematic block diagram illustrating the hardware blocks of a primary WCA according to one exemplary embodiment of the present invention.

In the ensuing description, numerous specific details are set forth for illustration purposes in order to provide a thorough understanding of the present invention. However, it will be apparent that the present invention may be practiced without these specific details. The following description is, therefore, not to be taken for limiting the scope of the present invention. In some exemplary scenarios, well-known structures and devices are shown in block diagram form in order to avoid unnecessarily obscuring the present invention.

Also, it is noted that the embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term 'storage medium' may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, compact disc ROM (CD-ROM), flash memory devices, a memory card and/or other machine-readable mediums for storing information. The term 'machine-readable medium' includes, but is not limited to portable or fixed storage devices, optical storage mediums, magnetic mediums, memory chips or cartridges, wireless channels, and various other mediums capable of storing, containing, or carrying instruction(s) and/or data. A machine-readable medium can be realized by virtualization and can be a virtual machine-readable medium including a virtual machine-readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire, and fiber optics. Transmission media can also take the form of acoustic or light waves, such as those generated during radio-wave and infra-red data communications.

A volatile storage may be used for storing temporary variables or other intermediate information during the execution of instructions by a processing unit. A non-volatile storage or static storage may be used for storing static information and instructions for the processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware, or microcode, the program instructions to perform the necessary tasks may be stored in a computer-readable storage medium.

A processing unit, such as processing units 101, 201, and 225 may be a field-programmable gate array (FPGA), a central processing unit (CPU), a microprocessor, a microcontroller, a digital signal processor (DSP), or any combination of those devices, or any other circuitry configurable to execute the program instructions for implementing the embodiments disclosed herein.

Embodiments of the present invention are related to the use of a computer system for implementing the techniques described herein. In an embodiment, the inventive processing units may reside on a machine such as a computer platform. According to one embodiment of the invention, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention.

Thus, implementations consistent with the principles of the invention are not limited to any specific combination of hardware circuitry and software.

A network interface may be implemented by a standalone electronic component or may be integrated with other electronic components, such as a node. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infra-red, High-Speed Packet Access (HSPA), HSPA+, Long Term Evolution (LTE), Worldwide Interoperability for Microwave Access (WiMax), General packet radio service (GPRS), Global System for Mobile Communications (GSM), Enhanced Data rates for GSM Evolution (EDGE), Code division multiple access (CDMA), wireless fidelity (Wi-Fi), CDMA2000, Wideband CDMA (WCDMA), Time Division CDMA (TD-SCDMA), BLUETOOTH, wireless broadband (WiBRO), Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

Embodiments, or portions thereof may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, an optical signal, radio frequency or other wireless communication signals, etc. The code segments may, in certain embodiments, be downloaded via computer networks such as the Internet, an intranet, LAN, metropolitan area network (MAN), WAN, the public switched telephone network (PSTN), a satellite communication system, a cable transmission system, and/or the like.

A system bus may carry signals between a master component (e.g., a processing unit) and peripheral components, or among the peripheral components. A system bus may include a plurality of signal lines connecting the components inside or outside of a device. A system bus disclosed herein may be realized using any of several types of bus structures, including a memory bus, a peripheral bus, or a local bus using any of a variety of bus architecture.

A mobile network operator (MNO), for the purposes of this specification, is a service provider of a cellular network that owns or controls, or both, the cellular network and all necessary elements including backhaul infrastructure, billing, customer care, provisioning computer systems to provide wireless voice and data communication services for its subscribed mobile users. An MNO is also known as a wireless service provider, wireless carrier, cellular company, cellular network service provider, or mobile network carrier.

A cellular network operated by an MNO may be implemented using multiple interconnected networks. In various embodiments, the cellular network may include multiple Radio Access Networks (RANs). The RANs may be connected to each other via regional ground networks. In turn, the regional ground networks may be connected to a core network by a WAN. Each regional portion of the cellular network may include one or more RANs and a regional circuit and/or packet-switched network and associated signaling network facilities The MNO may provide telecommunication services in accordance with one or more technical standards, such as EDGE, Wideband Code Division Multiple Access (W-CDMA), HSPA, LTE, CDMA-2000 (Code Division Multiple Access 2000), 5th Generation (5G), and/or so forth. In some embodiments, the core network of the cellular network may be accessed via wired or wireless local area networks (LANs). For example, a wireless local area network may be a network that is established using Wi-Fi or Bluetooth standards and hardware.

A subscriber identity module (SIM), disclosed in the present invention, may be a removable SIM housed in a SIM slot connected to a SIM interface or may be an embedded-SIM (eSIM) capable of storing a plurality of SIM profiles from a plurality MNOs. A removable SIM may be realized using a Universal Integrated Circuit Card (UICC) and an eSIM may be realized using an Embedded Universal Integrated Circuit Card (eUICC). When an eSIM is used, the installation, verification, management, and allotment of eSIM profiles may be managed by a remote management server owned by a respective MNO or a third party entity.

FIG. 1A illustrates a schematic block diagram of a primary WCA, such as primary WCA 100, according to one exemplary embodiment of the present invention. Primary WCA 100 comprises processing unit 101, main memory 102, system bus 103, secondary storage 104, WCM 105, SIM interface 106, eUICC 108, and interface 107. Secondary storage 104, WCM 105, and interface 107 are connected to processing unit 101 via system bus 103. Processing unit 101 and main memory 102 are connected to each other directly. SIM interface 106 and eUICC 108 may connect to WCM 105 either directly or via system bus 103. There is no limitation on the number of SIM interfaces, eUICCs, and WCMs. SIM interface 106, eUICC 108, and WCM 105 are disclosed for illustration purposes only. In one example, the number of SIM interface 106 is four and the number of WCM 105 is two. In another example, the number of SIM interface 106 is three and the number of WCM 105 is three. In one variant, primary WCA 100 comprises either a SIM interface or an eUICC that is connected to WCM 105.

Similarly, there is no limitation on the number of processing units contained in primary WCA 100. In one example, primary WCA 100 may comprise a plurality of processing units 101. One of the processing units 101 may be used as the main processing of primary WCA 100 to perform the functions assigned for primary WCA 100 wherein another one of the processing units 101 may be used as a proxy processing unit to perform the functions assigned for an auxiliary WCA. In that case, the auxiliary WCA will not be required to house a processing unit which may help to achieve a lighter hardware structure for the auxiliary WCA.

A primary WCA, such as primary WCA 100, includes, but is not limited to, ultra-mobile devices, mobile devices, personal digital assistants (PDAs), mobile computing devices, smartphones, telephones, digital telephones, cellular telephones, e-book readers, handsets, one-way pagers, interactive pager, messaging device, computer, personal computer (PC), desktop computer, laptop computer, or any other sort of electronic or computing device.

Interface 107 may be a USB-B type interface, USB-A type interface, a micro USB, a lightning interface, or a USB Type C interface.

Figure 1B:
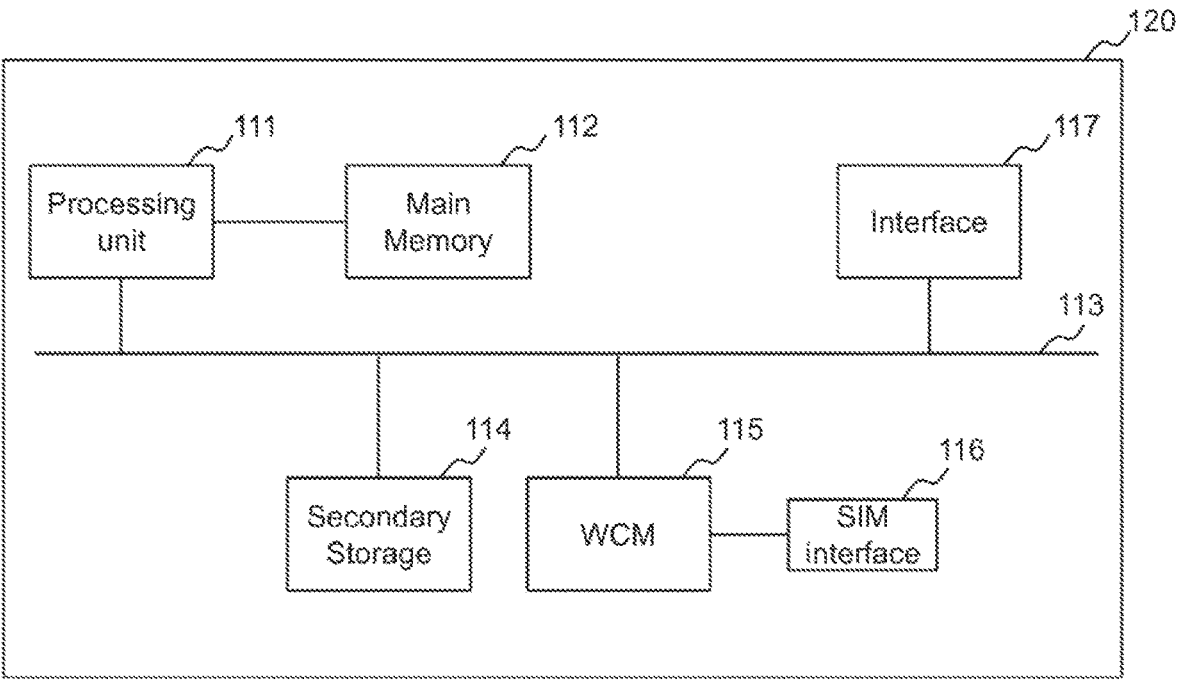
FIG. 1B is a schematic block diagram illustrating the hardware blocks of an auxiliary WCA according to one exemplary embodiment of the present invention.

FIG. 1B illustrates a schematic block diagram of an auxiliary WCA, such as auxiliary WCA 120, according to one exemplary embodiment of the present invention. Auxiliary WCA 110 may comprise processing unit 111, main memory 112, system bus 113, secondary storage 114, WCM 115, SIM interface 116, and interface 117. Secondary storage 114, WCM 115, and interface 117 are connected to processing unit 111 via system bus 113. Processing unit 111 and main memory 112 are connected to each other directly. SIM interface 116 may be connected to at least one WCM 115. There is no limitation on the number of SIM interfaces and WCMs. SIM interface 106 and WCM 115 are disclosed for illustration purposes only. In one example, the number of SIM interface 116 is one and the number of WCM 115 is two. In another example, the number of SIM interface 116 is two and the number of WCM 115 is three. SIM interface 116 may be connected to a removable SIM, such as a UICC, or an embedded SIM, such as an eUICC.

Similarly, there is no limitation on the number of processing units contained in the auxiliary WCA. In one example, auxiliary WCA 120 may comprise a plurality of processing units 111. One of the processing units 111 may be used as the main processing of auxiliary WCA 120 to perform the functions assigned for auxiliary WCA 120 wherein another one of the processing units 101 may be used as a proxy processing unit to perform the functions assigned for a primary WCA connected to auxiliary WCA 120. When a processing unit of auxiliary WCA 120 performs as a proxy processing unit of the primary WCA connected to auxiliary WCA 120, the performance of the primary WCA may be increased.

Interface 117 may be a USB-B type interface, USB-A type interface, a micro USB, a lightning interface, or a USB Type C interface. There is no limitation that auxiliary WCA 120 may only comprise the aforementioned hardware components. In a different exemplary scenario, auxiliary WCA 120 may comprise or be connected to additional hardware components and peripherals which enables auxiliary WCA 120 to perform particular functions more effectively than primary WCA 100. Such functions may include, but are not limited to, computation of a large amount of data, monitoring of an area or monitoring of information to detect an abnormality, communicating with high bandwidth, measuring of any given subject matter, and inspecting of data.

Figure 2A:
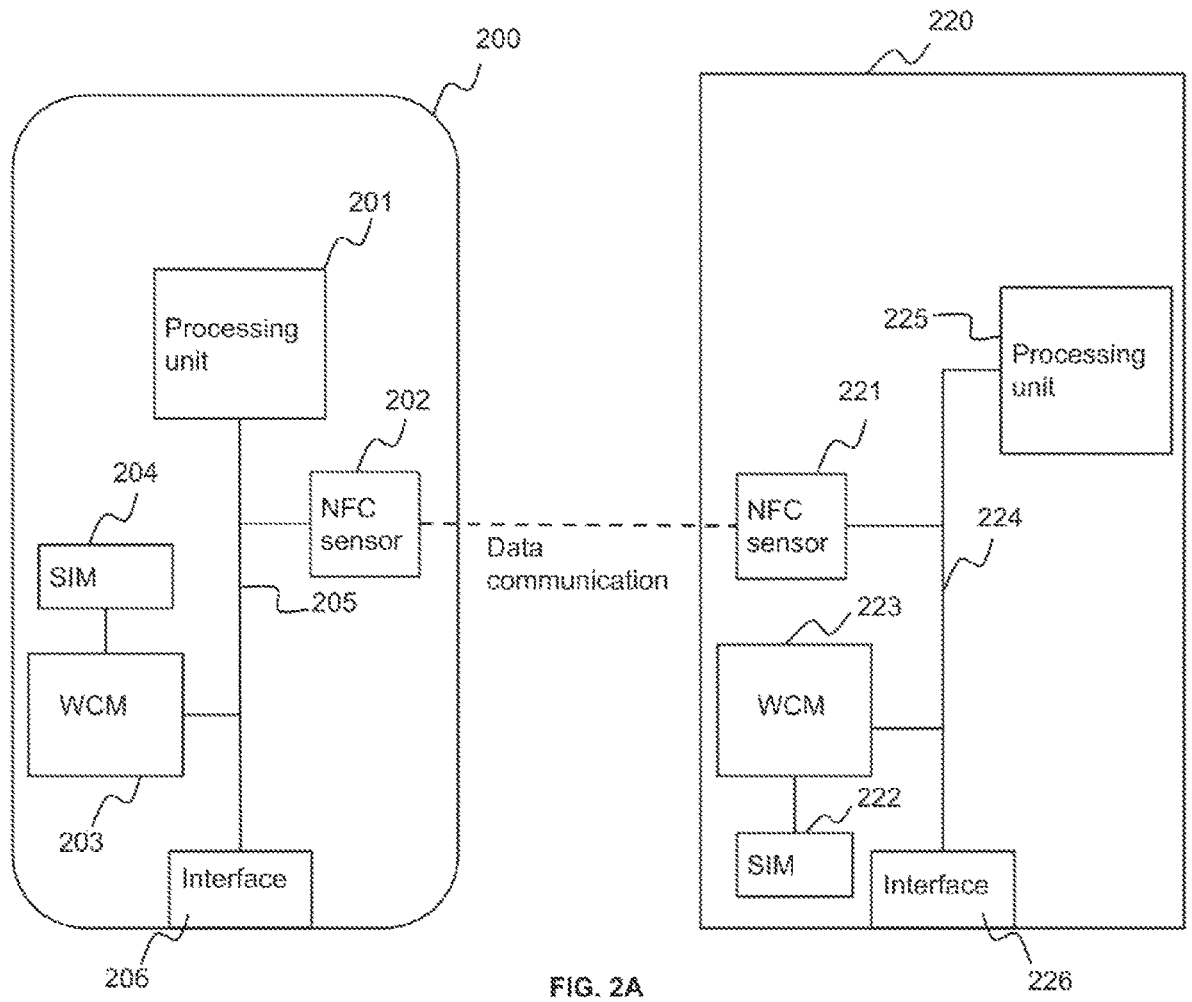
FIG. 2A is a schematic block diagram illustrating the hardware blocks of a primary WCA and an auxiliary WCA according to one exemplary embodiment of the present invention.

FIG. 2A illustrates a schematic block diagram of a primary WCA, such as primary WCA 200, and an auxiliary WCA, such as auxiliary WCA 220, according to one embodiment of the present invention. Primary WCA 200 and auxiliary WCA 220 are configurable to perform data communication with each other. Primary WCA 200 may be similar to primary WCA 100 as shown in FIG. 1A and auxiliary WCA 220 may be similar to auxiliary WCA 120 as shown in FIG. 1B. For illustration purposes, primary WCA 200 may comprise processing unit 201, near-field communication (NFC) sensor 202, WCM 203, SIM 204, system bus 205, and interface 206; and auxiliary WCA 220 may comprise NFC sensor 221, SIM 222, WCM 223, system bus 224, processing unit 225 and interface 226. The processing units and the associated peripheral components of primary WCA 200 and auxiliary WCA 220 may be attached to a flexible printed circuit board (PCB) or a rigid PCB.

Primary WCA 200 and auxiliary WCA 220 are capable of establishing at least one wireless connection for data communication through NFC sensor 202, and NFC sensor 221. In one variant, both NFC sensors 202 and 221 are capable of performing as a power transmitter or a power receiver. Thus, when primary WCA 200 requires backup power, auxiliary WCA 220 may be used to provide backup power by establishing a connection between NFC sensors 202 and 221. On the other hand, when auxiliary WCA 220 requires backup power, primary WCA 200 may be used to provide backup power using a connection between NFC sensors 202 and 221. In one variant, NFC sensors 202 and 221 may be used for transmitting/receiving power and data concurrently between primary WCA 200 and auxiliary WCA 220.

Figure 2B:
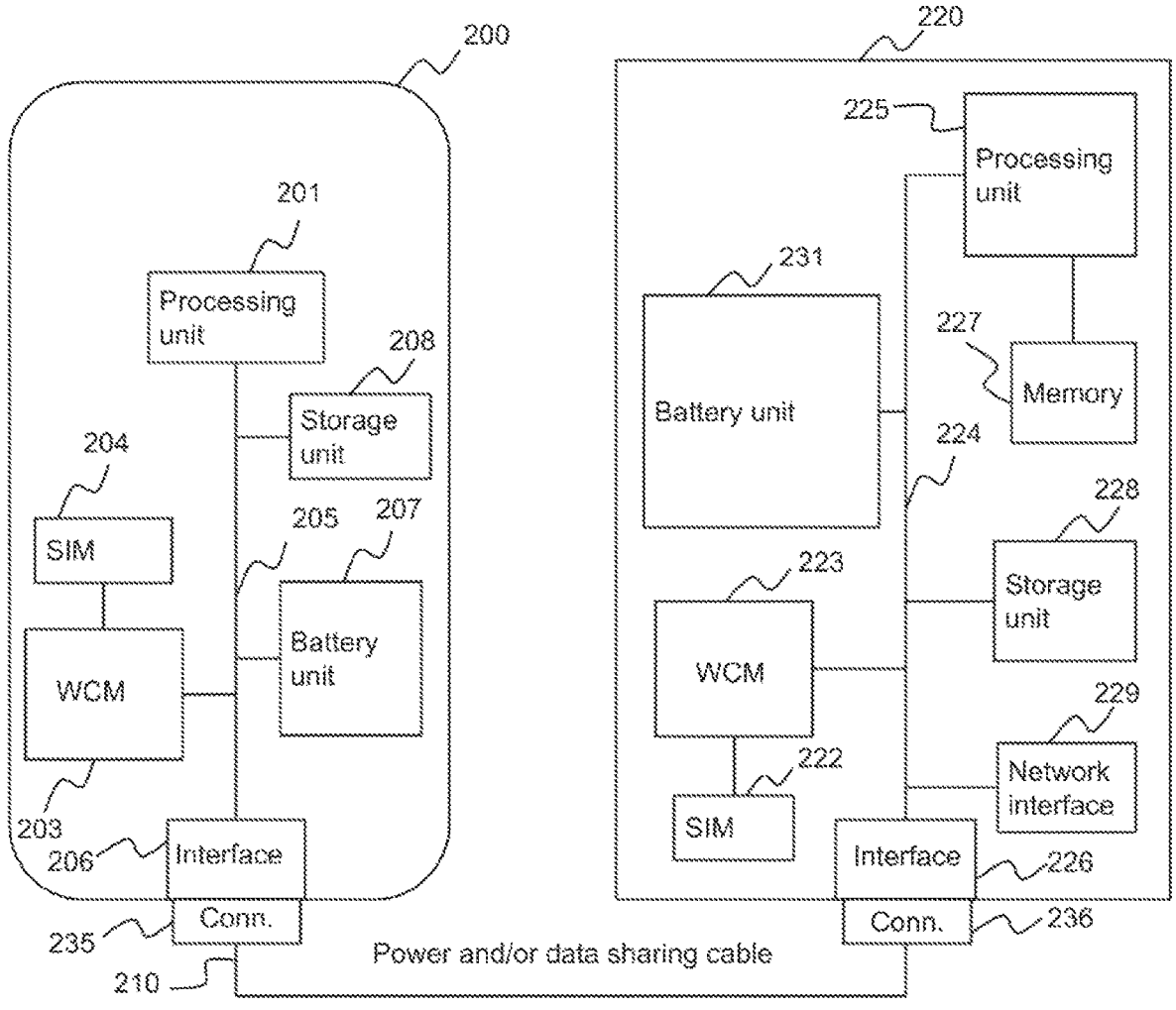
FIG. 2B is illustrating another variant of a primary WCA and an auxiliary WCA according to one exemplary embodiment of the present invention.

FIG. 2B illustrates another variant of primary WCA 200 and auxiliary WCA 220 according to one exemplary embodiment of the present invention. Primary WCA 200 and auxiliary WCA 220 may be physically connected using a cable, such as cable 210. For example, cable 210 may be, without limitation, a USB type C to lightning cable. The cable may vary depending on the types of interfaces of primary WCA 200 and auxiliary WCA 220. Cable 210 may have a connector at each of the ends, such as connectors 235 and 236. Connectors 235 and 236 are capable of connecting with a corresponding interface of primary WCA 200 and/or auxiliary WCA 220. For example, connector 235 may be capable of connecting with interface 206 of primary WCA 200, and connector 236 may be capable of connecting with interface 226 of auxiliary WCA 220.

Cable 210 may be used for supplying/receiving power and performing data communication. For illustration purposes, when battery unit 207 is out of power or low on power, primary WCA 200 is configurable to use battery unit 231 of auxiliary WCA 220 as a backup power supply.

Primary WCA 200 may also comprise a storage unit, such as storage unit 208. Auxiliary WCA 220 may also comprise a memory unit, such as memory unit 227, a storage unit, such as storage unit 228, and a network interface, such as network interface 229. Memory unit 227 may be directly connected with processing unit 225 and storage unit 228 and network interface 229 may be connected to system bus 224.

In one variant, auxiliary WCA 220 may not comprise a battery unit in order to lighten the weight of auxiliary WCA 220. In such instances, auxiliary WCA 220 may be configured in a manner to use the battery unit of primary WCA 200 as a source of power for its operation.

Figure 2C:
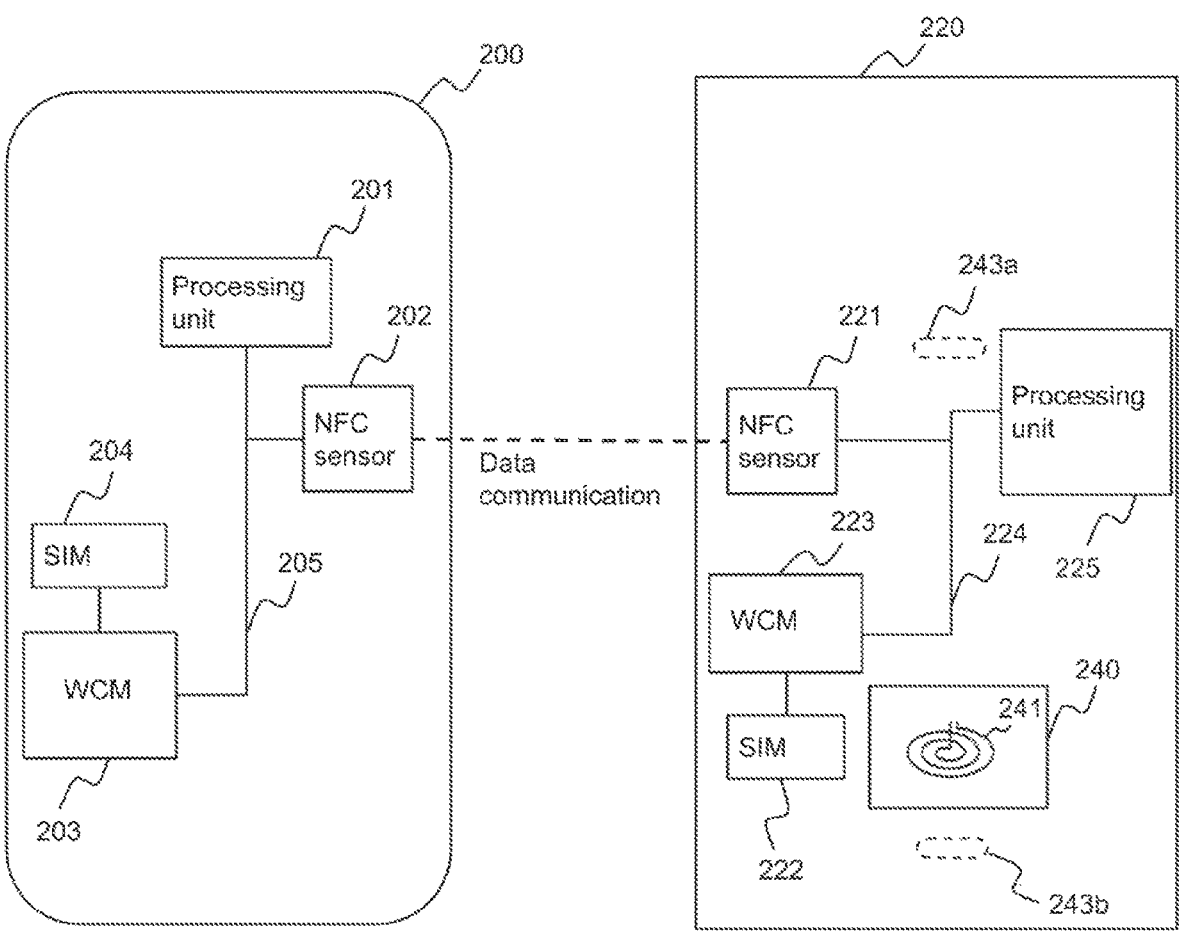
FIG. 2C is illustrating another variant of a primary WCA and an auxiliary WCA according to one exemplary embodiment of the present invention.

According to one embodiment of the present invention, as shown in FIG. 2C, auxiliary WCA 220 may have a wireless charging system, such as wireless charging system 240. Wireless charging system 240 may include, but is not limited to, a receiver induction coil, such as receiver induction coil 241. Receiver induction coil 241 is capable of being connected with a transmitter induction coil when receiver induction coil 241 is actively placed within the range of an electromagnetic energy field created by the transmitter induction coil. The transmitter induction coil may be similar to any of the transmitter induction coils 301, 311, or 315 shown in FIG. 3B. After establishing the connection, receiver induction coil 241 may receive power transmitted by the transmitter induction coil through the electromagnetic energy field and then induce the received power to a battery unit of auxiliary WCA 220.

In one variant, auxiliary WCA 220 may establish data communication with a wireless charging dock comprising the transmitter induction coil. Therefore, when a plurality of devices is within the range of the electromagnetic energy field, the wireless charging dock may establish a pair with an expected device to receive power. For example, the wireless charging dock may establish a pair with auxiliary WCA 220.

Auxiliary WCA 220 may also comprise ferromagnetic material parts, such as ferromagnetic materials 243a and 243b. Ferromagnetic materials 243a and 243b may be mounted on the back side of the auxiliary WCA 220.

Figure 2D:
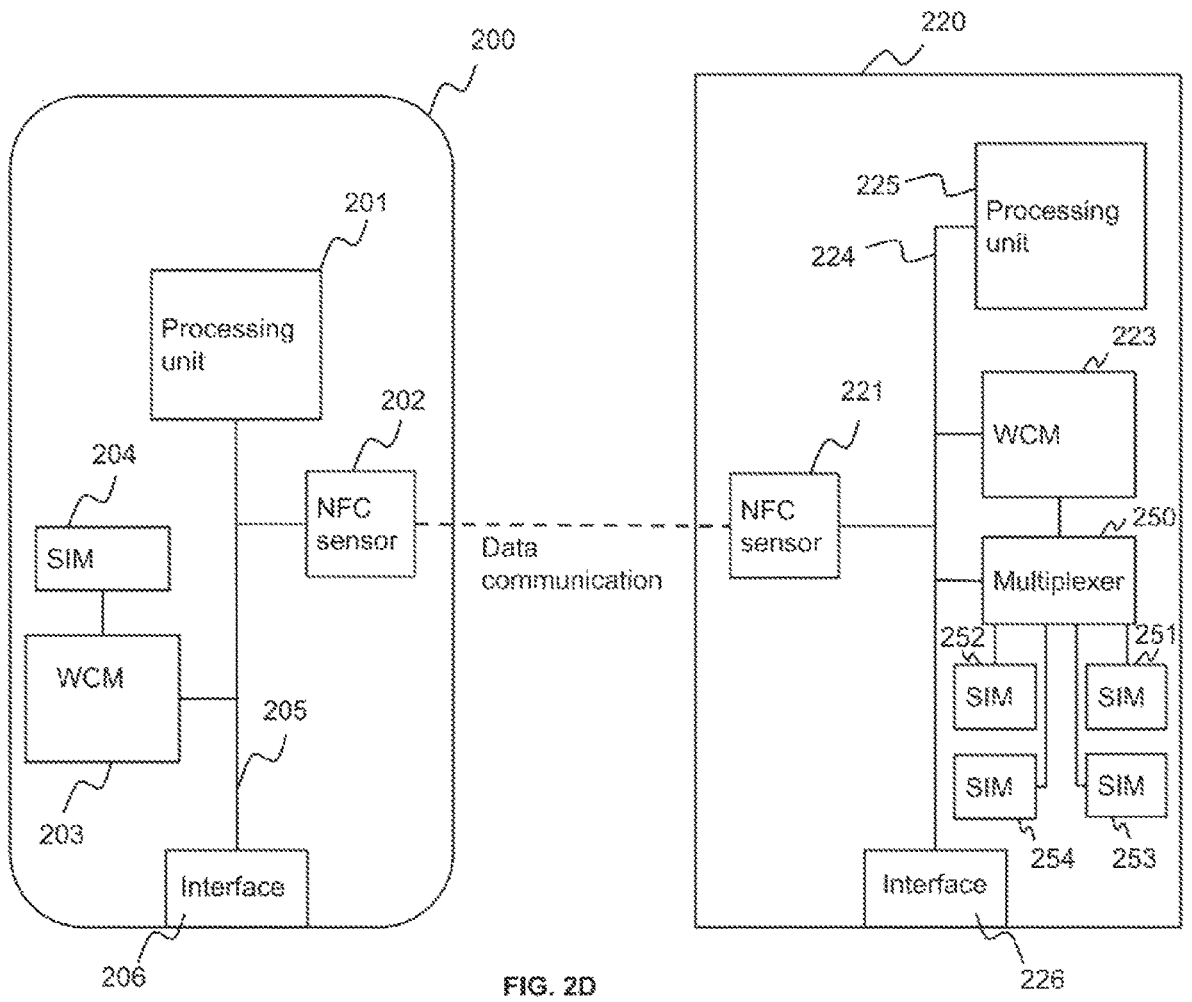
FIG. 2D is illustrating another variant of a primary WCA and an auxiliary WCA according to one exemplary embodiment of the present invention.

According to one embodiment of the present invention, depicted in FIG. 2D, auxiliary WCA 220 is capable of housing a plurality of SIMs, such as SIMs 251-254. SIMs 251-254 may be connected to WCM 223 through a SIM selector. The SIM selector may be realized using a multiplexer, such as multiplexer 250. Multiplexer 250 may perform SIM selection based on instructions provided by processing unit 225 of auxiliary WCA 220 or processing unit 201 of primary WCA 200. The processing unit may select a SIM based on at least one SIM selection policy. In one variant, WCM 223 and multiplexer 250 may exchange data or signals through a direct connection. In another variant, WCM 223 and multiplexer 250 may exchange data or signals through system bus 224.

There is no limitation that a multiplexer must be used for SIM selection. Any method that is capable of implementing SIM selection may be implemented. For example, the SIM selection may also be realized using a Complex Programmable Logic Device (CPLD). The multiplexer mentioned here is only for illustrative purposes.

There is no limitation on the number of SIMs capable of being coupled to auxiliary WCA 220. For example, the number of SIMs may be two or ten. In one variant, SIMs 251-254 may be physical SIMs that are removable. In that case, each of SIMs 251-254 may be placed in a SIM slot connected with a SIM interface. In another variant, SIMs 251-254 may be eSIMs that are not designed to be removed. In that case, the eSIMs may be built in or soldered on the printed circuit board of auxiliary WCA 220. In another variant, SIMs 251-254 include a combination of removable SIMs and non-removable SIMs. For example, SIMs 251 and 252 may be removable SIMs, and SIMs 253 and 254 may be non-removable SIMs.

Figure 2E:
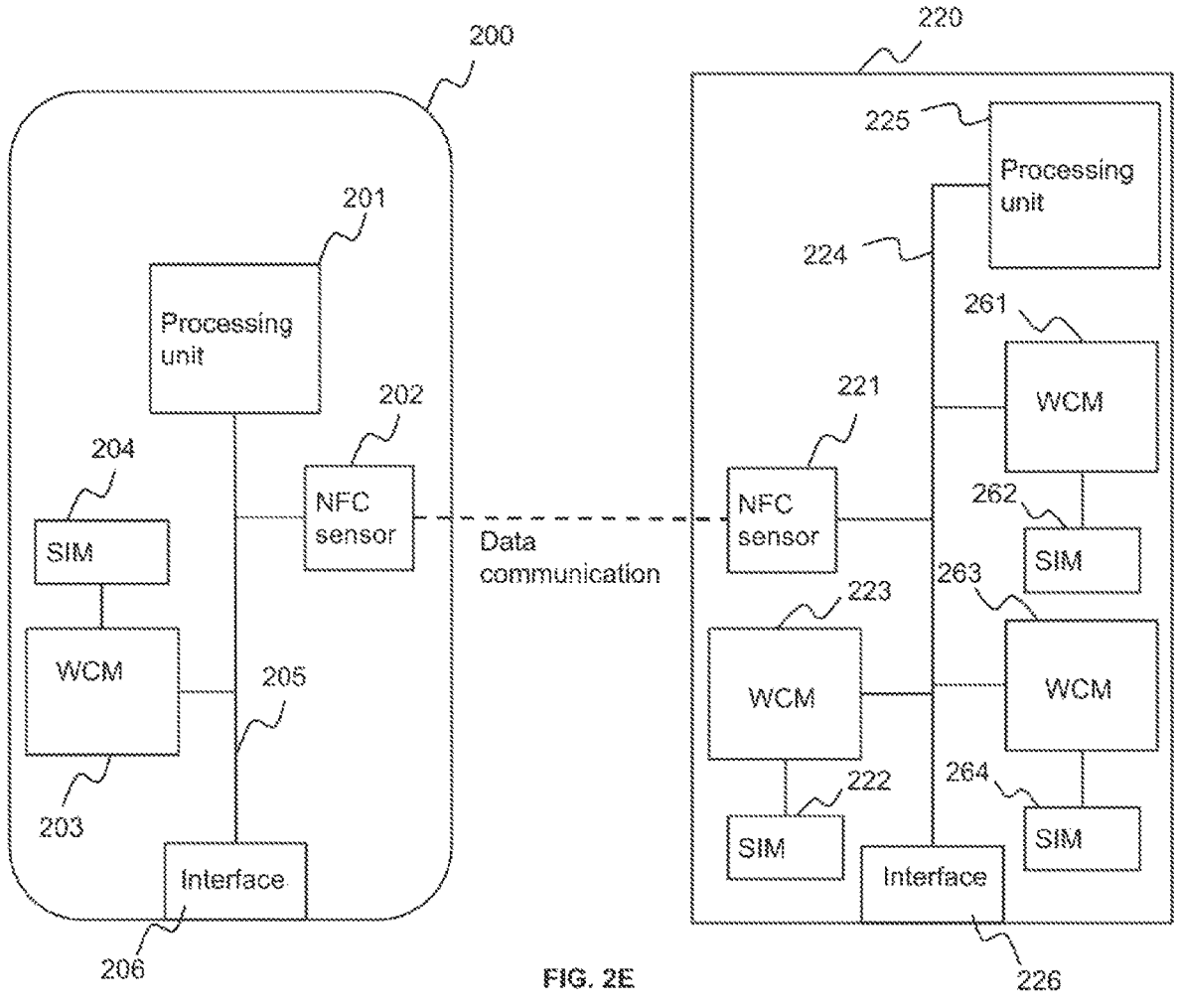
FIG. 2E is illustrating another variant of a primary WCA and an auxiliary WCA according to one exemplary embodiment of the present invention.

According to one embodiment of the present invention, depicted in FIG. 2E, auxiliary WCA 220 may comprise a plurality of SIMs and a plurality of WCMs. For illustration purposes, in addition to WCM 223, auxiliary WCA 220 may also comprise WCMs 261 and 263. Similar to WCM 223, WCMs 261 and 263 may also comprise a SIM slot, connected through a SIM interface, for housing a removable SIM. For illustration purposes, WCM 261 houses SIM 262, and WCM 263 houses SIM 264. In one variant, SIMs 222, 262, and 264 may be eSIM, thus, they may be built-in with WCMs 223, 261, and 263 respectively. In one variant, the SIMs may be placed onto the WCMs directly.

Figures 3A, 3B:
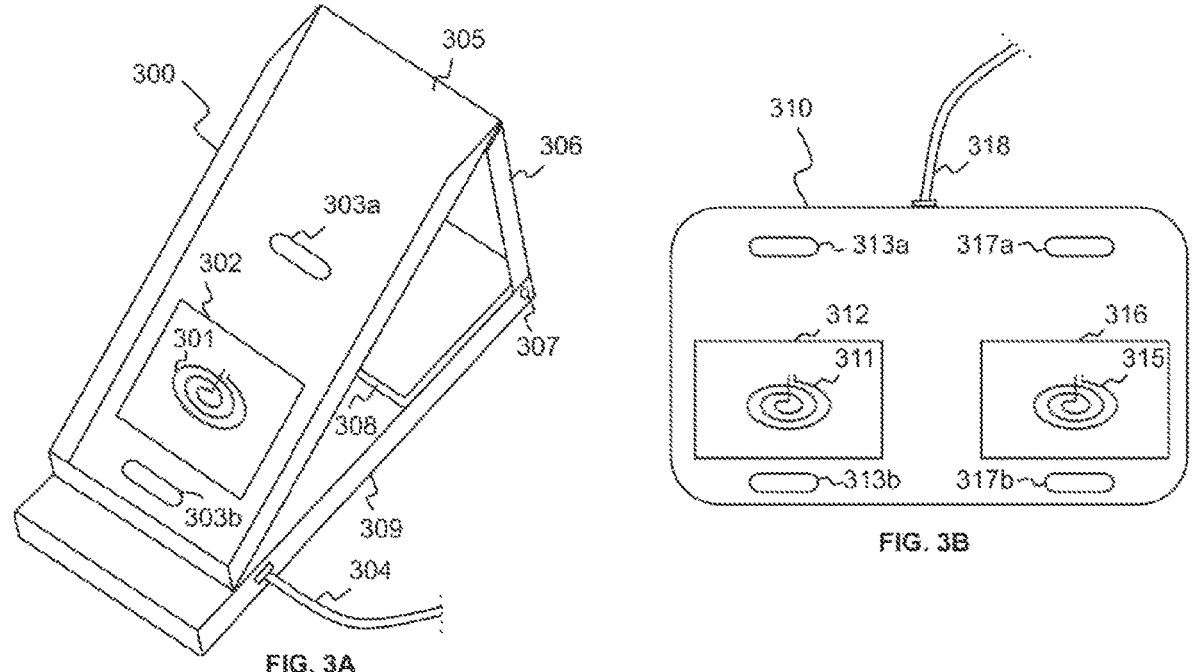
FIGS. 3A and 3B are illustrating an exemplary wireless charging dock and an exemplary wireless charging pad respectively.

FIGS. 3A and 3B respectively illustrate an exemplary wireless charging dock, such as wireless charging dock 300, and an exemplary wireless charging pad, such as wireless charging pad 310. Wireless charging dock 300 and wireless charging pad 310 may comprise at least one wireless charging system. For illustration purposes, wireless charging dock 300 comprises wireless charging system 302 and wireless charging pad 310 comprises wireless charging systems 312 and 316. Wireless charging systems 302, 312, and 316 are configurable to supply power wirelessly to at least one WCA through an induction coil. For example, wireless charging dock 300 comprises a transmitter induction coil 301. Thus, when a WCA comprising a receiver induction coil, such as auxiliary WCA 220 depicted in FIG. 2C is placed onto wireless charging dock 300, the WCA will be able to receive power supplied by transmitter induction coil 301. In one variant, the WCA may not be required to place onto wireless charging dock 300 in order to receive power. The WCA may be able to receive power when it comes within the range of an electromagnetic field created by transmitter induction coils 301, 311, or 315.

Wireless charging dock 300 may be specifically designed proportionally to the size of the WCAs so that wireless charging dock 300 can effectively hold the WCAs. Wireless charging dock 300 may also comprise one or more magnetic grips, such as magnetic grips 303a and 303b, in order to adjust the position of a WCA in a manner so that when it is placed onto wireless charging dock 300, the transmitter induction coil and receiver induction coil are positioned on top of each other. This will increase the effectiveness of the charging by reducing the possibility of power leakage while charging. The magnetic grips 303a and 303b are capable of attaching with ferromagnetic materials positioned on the back side of the WCAs, such as ferromagnetic materials 243a and 243b depicted in FIG. 2C. A magnetic grip may be realized using a magnet directly or by covering the magnet with cushioning material. Magnetic grips 303a and 303b may also be useful to stop slipping off of a WCA from wireless charging dock 300 when the WCA is placed on wireless charging dock 300 for charging.

A power cable, such as power cable 304 of wireless charging dock 300 and power cable 318 of wireless charging pad 310 may be connected to an alternating current (AC) adapter through a USB interface. The AC adapters may have a USB port to connect to the USB interface. The AC adapters may be capable of connecting with AC power sources and comprise transformers to convert the AC into direct current (DC) which is then supplied through power cables 304 and 318. In another variant, power cables 304 and 318 may be connected to an AC plug and the auxiliary WCA may comprise a transformer to convert the incoming AC into DC before supplying the current to the battery unit.

Wireless charging dock 300 may also comprise a holding plate, such as holding plate 305, to hold or place a WCA when the WCA is placed for charging. Wireless charging dock 300 may also comprise a holding plate support 306, a control knob 307, a holding plate support slot 308, and a ground support 309 which will be discussed later in more detail.

Although the function of wireless charging dock 300 and wireless charging pad 310 is the same, they may have different attributes. One of the differences between wireless charging dock 300 and wireless charging pad 310 may be that wireless charging dock 300 and wireless charging pad 310 have different structures. Wireless charging dock 300 may have an angled holding plate on the front side of wireless charging dock 300 to hold a WCA while charging. Therefore, wireless charging dock 300 may also be used as a WCA holding mount, i.e., as a phone mount. Wireless charging dock 300 may be more suitable when a user wants to use a WCA while the WCA or another WCA holding the WCA is being charged. The term "charge" may refer to the electrical charge. The function of charging may refer to the process of power being stored in a battery unit. In some exemplary scenarios, the term "charge" and "power" may be used interchangeably. For illustration purposes, the WCA may be primary WCA 200 and the another WCA may be auxiliary WCA 220. For example, wireless charging dock 300 may be placed on a car dashboard or on top of a table while holding a WCA in an angled position so that a mounted display unit of the WCA can be clearly watched by a user.

On the other hand, wireless charging pad 310 may have a flexible flat structure that is suitable for a flat surface. The benefit of having a flexible flat structure may be when wireless charging pad 310 is placed on a flat surface, such as on top of a desk, wireless charging pad 310 may have adequate grip so that it will not slip off from a normal shaking of the surface.

Another difference between the wireless charging dock 300 and wireless charging pad 310 may be the materials that are used to make wireless charging dock 300 and wireless charging pad 310. Wireless charging dock 300 may be made using hard non-electric conductive materials, such as plastic, paper, rubber, wood, porcelain, ceramic, and glass. On the contrary, wireless charging pad 310 may be made using flexible non-electric conduction materials, such as rubber, fiber, and paper.

Another difference between wireless charging dock 300 and wireless charging pad 310 may be in the number of WCAs charging capacity simultaneously. For example, wireless charging dock 300 may comprise a single wireless charging system, such as wireless charging system 302 including one transmitter induction coil, such as transmitter induction coil 301. Thus, wireless charging dock 300 may be capable of charging one WCA at a time.

On the other hand, wireless charging pad 310 may comprise a plurality of wireless charging systems including a plurality of transmitter induction coils to charge a plurality of WCAs concurrently. For illustration purposes, wireless charging pad 310 comprises wireless charging systems 312 and 316 including transmitter induction coils 311 and 315. There is no limitation that the number of wireless charging systems of wireless charging pad 310 should be limited to two. In one variant, wireless charging pad 310 may comprise five or ten wireless charging systems to charge five or ten WCAs concurrently. For each wireless charging system, wireless charging pad 310 may comprise a pair of magnetic grips to adjust a WCA onto a wireless charging system. For illustration purposes, wireless charging pad 310 may comprise magnetic grips 313a and 313b to adjust a WCA onto wireless charging system 312, and magnetic grips 317a and 317b to adjust a WCA onto wireless charging system 316.

Figure 4:
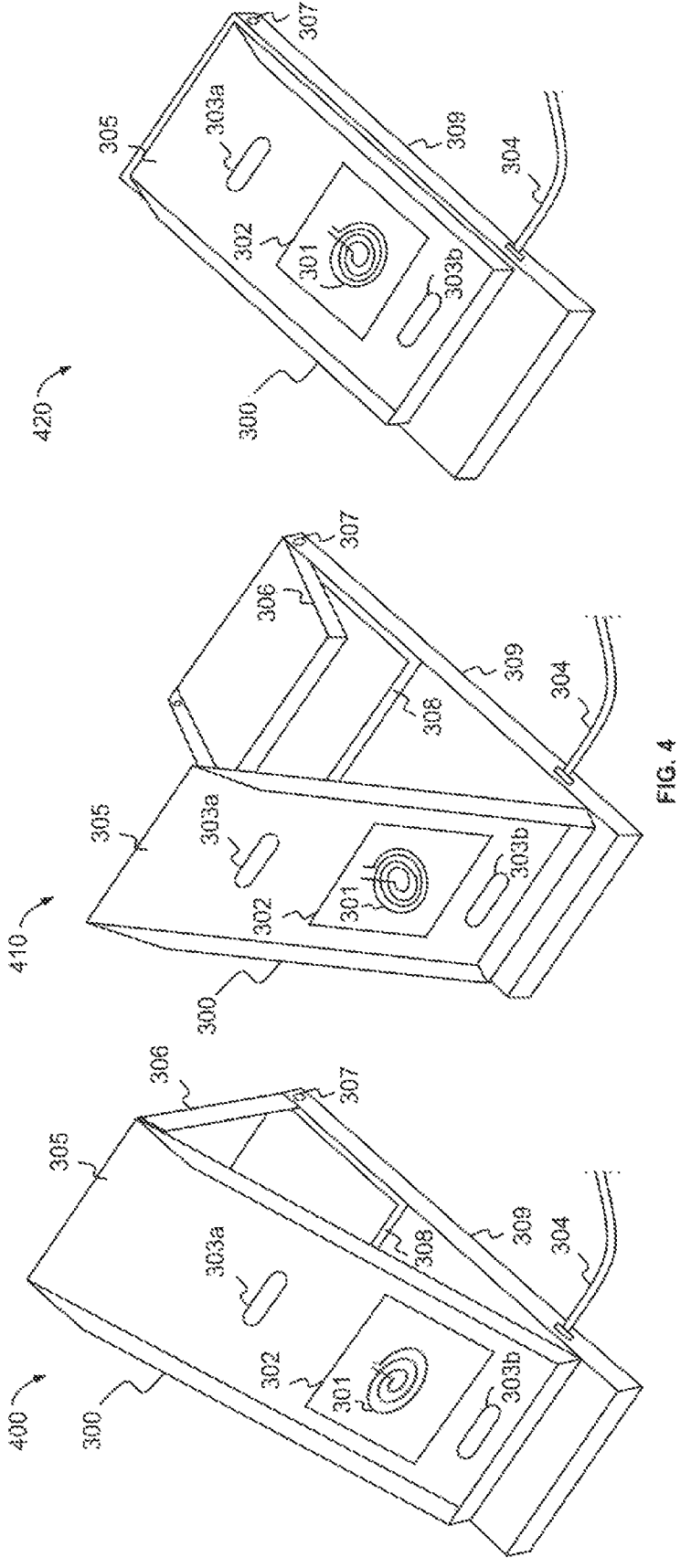
FIG. 4 is illustrating the foldability of an exemplary wireless charging dock.

FIG. 4 illustrates the foldability of an exemplary wireless charging dock 300. Site 400 depicts that holding plate 305 can be put in an angled position when a user wants to use a WCA or watch a display unit of a WCA when the WCA is placed on wireless charging dock 300 for charging. Holding plate support 306 may be used to support holding plate 305 when holding plate 305 is kept in an angled position.

In different exemplary scenarios, a user may want to keep holding plate support in the flat position. As depicted in site 410, control knob 307 may be used to control holding plate support 306 to keep holding plate support 306 in a vertical position or in a horizontal position. When holding plate support 306 is kept in a horizontal position, holding plate support 306 may be placed in holding plate support slot 308. Holding plate support slot 308 may be made proportional to the size of holding plate support 306. After placing holding plate support 306 in holding plate support slot 308, holding plate 305 may be put into a flat position as depicted in site 420. There is no limitation on the number of elements or in the design of wireless charging dock 300. The aforementioned structure of wireless charging dock 300 is disclosed for illustration purposes only. In one variant, wireless charging dock 300 itself may be an auxiliary WCA.

Figure 5A:
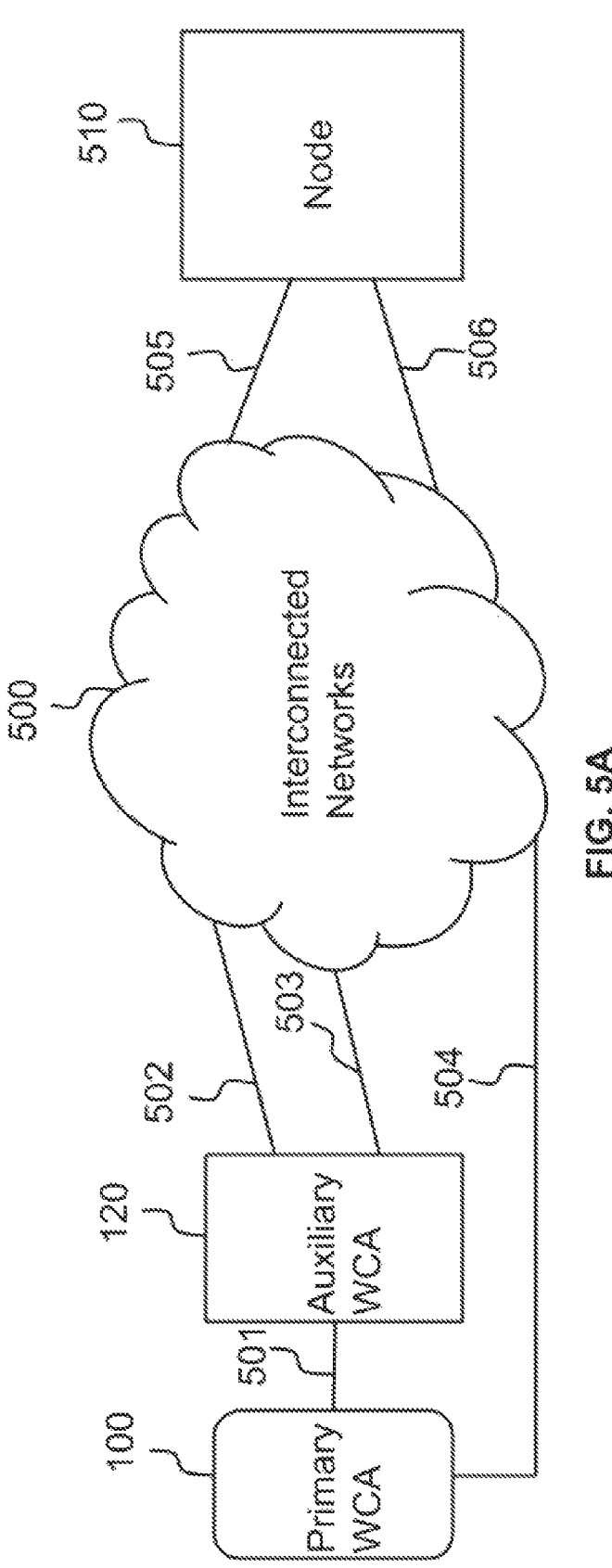
FIG. 5A is illustrating an exemplary network diagram of the present invention.

FIG. 5A illustrates a typical network topology where a plurality of network devices, such as auxiliary WCA 120, primary WCA 100, and node 510 are connected together to implement the methods disclosed in the present invention. The network devices, such as auxiliary WCA 120, primary WCA 100, and node 510, disclosed herein include, without limitation, any computing system capable of sending and receiving data, such as a personal computer, a server computer, tablet PC, mobile phones, internet of things (IoT) devices, routers, firewalls, etc. For illustration purposes, according to one embodiment of the present invention, auxiliary WCA 120 is a phone case and primary WCA 100 is a mobile phone.

Interconnected networks 500 may comprise one or more MANs, WANs, wireless networks, PSTN, the Internet, an intranet, an extranet, or other similar networks. primary WCA 100 may be connected to auxiliary WCA 120 through connection 501. Connection 501 may be established using NFC, Wi-Fi, Bluetooth, radio frequency identification (RFID), Zigbee, long range (LoRa), Infrared, Microwave radio, recommended standard 232 (RS-232), universal serial bus (USB), or USB type C to lightning cable. Node 510 may also be connected to other devices or servers, such as one or more file servers, database servers, management servers, storage servers, work stations, display units, and/or computing devices using a LAN connection. Any electronic device with networking capability may connect to auxiliary WCA 120, 100, and network device 510. In one variant, node 510 may also be a mobile phone similar to primary WCA 100 or a phone case similar to auxiliary WCA 120.

WAN connections 502, 503, 504, 505, and 506 are used by primary WCA 100 or auxiliary WCA 120 and node 510 respectively for communicating information with each other over interconnected networks 500. These numbers of WAN connections are shown for illustration purposes only. A person skilled in the art would appreciate that any number and arrangement of WAN connections are possible to be adapted by auxiliary WCA 120, primary WCA 100, and node 510. WAN connections 502-506 may comprise different types of network connections, such as Wi-Fi, fiber optics, cable, DSL, T1, 3G, 4G, 5G, satellite connections, Ethernet, asynchronous transfer mode (ATM), and the like. It is also noted that any of the auxiliary WCA 120, primary WCA 100, and node 510 may be thought of as both a sender or receiver and discussions regarding the functionality of either of these devices may be implemented on the other device. WAN connections 502-506 may have similar or different network characteristics, including packet loss rate and bandwidth capability. Communications between auxiliary WCA 120, primary WCA 100, and node 510 may be implemented as a symmetrical network with bidirectional data transfer capabilities.

In one scenario, primary WCA 100 may connect to interconnected networks 500 through auxiliary WCA 120, such as using connections 501 and 502 or using connections 501 and 503. In another scenario, primary WCA 100 may connect to interconnected networks 500 without auxiliary WCA 120, such as using connection 504.

One of the benefits of using auxiliary WCA 120 by primary WCA 100 may be, through auxiliary WCA 120, primary WCA 100 becomes capable of establishing an increased number of physical connections with interconnected networks 500. Thus, primary WCA 100 may use the increased number of physical connections for establishing an additional number of logical connections with node 510 or with other network devices, and may thereby increase the bandwidth and reliability.

Figure 5B:
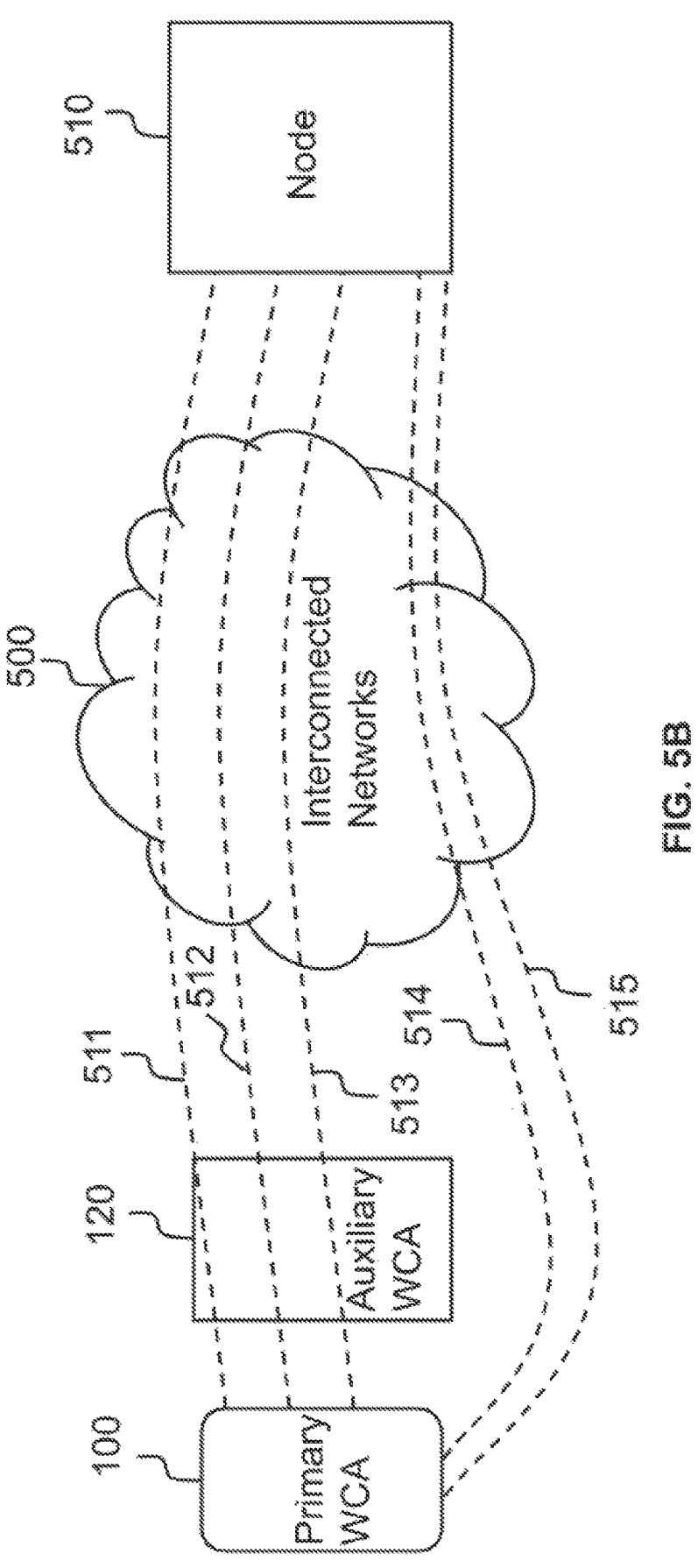
FIG. 5B is illustrating a plurality of exemplary virtual private network (VPN) tunnels established between a primary WCA and a node.

FIG. 5B should be viewed in conjunction with FIG. 5A. FIG. 5B depicts a plurality of exemplary VPN tunnels established between primary WCA 100 and node 510, such as VPN tunnels 511-515. There is no limitation on the protocols that can be used for establishing the VPN tunnels. For example, the protocols to establish the VPN tunnels may include, but are not limited to, WireGuard, OpenVPN, internet key exchange version 2/internet protocol security (IKEv2/IPSec), layer 2 tunneling protocol/internet protocol security (L2TP/IPSec), secure socket tunneling protocol (SSTP), and point-to-point protocol (PPTP). Some of the VPN tunnels may be established through auxiliary WCA 120 and some of the VPN tunnels may be established without auxiliary WCA 120. For illustration purposes, VPN tunnels 511, 512, and 513 are established first through connection 501, then through either one or both of connections 502 and 503, and then through either one or both of connections 505 and 506; while VPN tunnels 514 and 515 are established first through connection 504, and then through one or both of connections 505 and 506.

There is no limitation that only the aforementioned connections are used for establishing the VPN tunnels. There may be a plurality of intermediary physical connections with a plurality of intermediary network devices that are used for establishing the VPN tunnels which are not shown in order to avoid obscuring the disclosure. The intermediary network devices may be network firewalls, routers, Deep Packet Inspection (DPI) devices, or any kind of electronic or computing device that has the capability to identify transport layer segments and decide to drop, delay, assign lower priority, or allow them. The plurality of VPN tunnels 511-515 may be established, through a plurality of wireless connections established using the WCMs of auxiliary WCA 120 and primary WCA 100, with node 510. Other VPN tunnels may also be established, through the plurality of wireless connections established using the WCMs of auxiliary WCA 120 and primary WCA 100 with other intermediary network devices.

In one variant, when performing data communication using VPN tunnels 511-515, primary WCA 100 may use one of the plurality of VPN tunnels 511-515 that is selected based on one or more selection policies, for transmitting or receiving the data packets. In another variant, primary WCA 100 may use more than one of the plurality of VPN tunnels simultaneously data packets belonging to the same data session in order to increase the speed of data communication.

In another variant, one or more of the plurality of VPN tunnels may be aggregated to form one aggregated tunnel. primary WCA 100 may use the aggregated tunnel for data communication without selectively choosing a data tunnel for transmitting or receiving data packets. There is no limitation that there should be on aggregated tunnel only. There may be a plurality of aggregated tunnels established between primary WCA 100 and node 510. For example, one aggregated tunnel may be established using the tunnels established through auxiliary WCA 120, such as tunnels 511-513 and another aggregated tunnel may be established using the tunnels established without auxiliary WCA 120, such as tunnels 514-515. Thus, when a plurality of aggregated tunnels is established, one or more of the plurality of the aggregated tunnels may be selected by primary WCA 100 based on an aggregated tunnel selection policy for performing data communication.

Figure 5C:
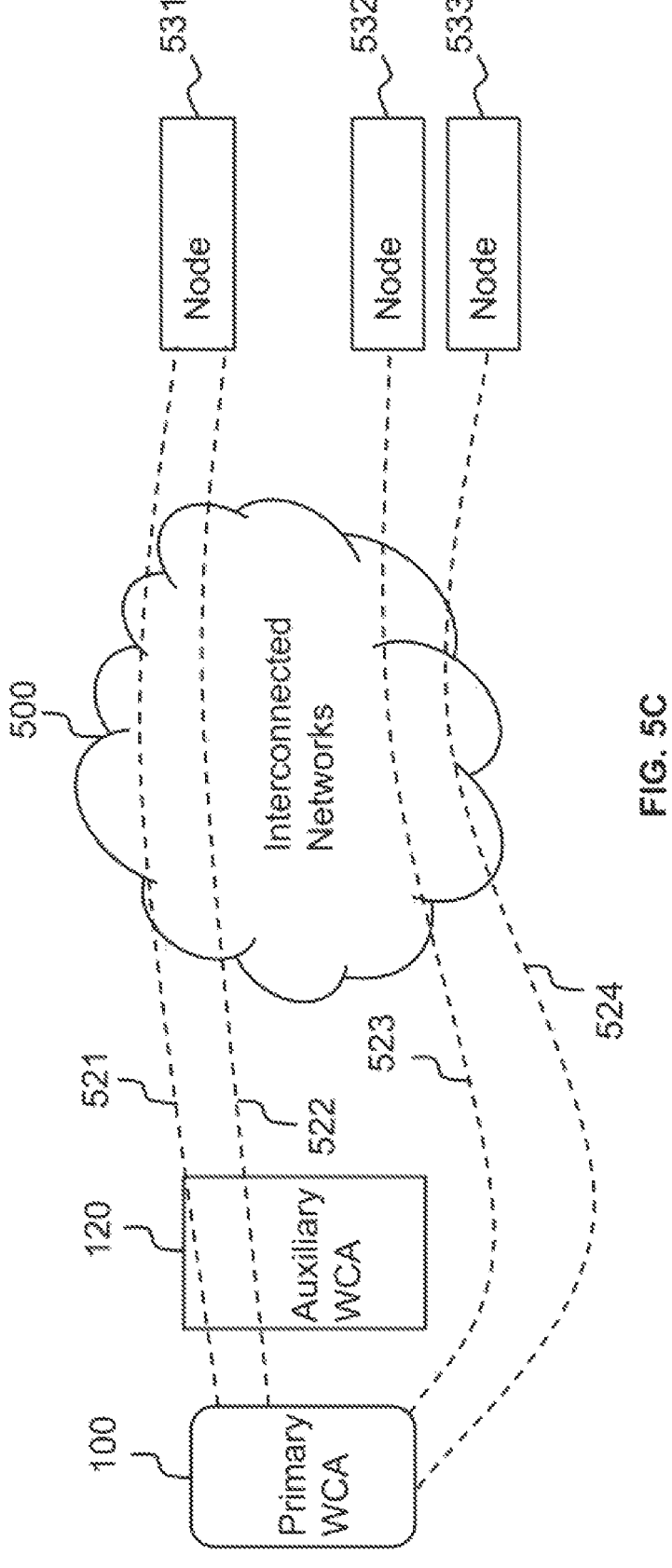
FIG. 5C is illustrating a plurality of exemplary logical connections established between a primary WCA and different nodes.

In another variant, depicted in FIG. 5C, primary WCA 100 may perform data communications by establishing a plurality of logical connections over the physical WAN connections established using auxiliary WCA 120 or without auxiliary WCA 120. However, in FIG. 5C the plurality of logical connections are not VPN tunnels. For illustration purposes, a plurality of logical data connections 521, 522 and 523, and 524 are disclosed where logical data connections 521 and 522 are established using auxiliary WCA 120 and logical data connections 523 and 524 are established without auxiliary WCA 120. Each of the plurality of logical data connections may be established by combining one or more logical connections among auxiliary WCA 120, primary WCA 100, node 531-533, or other intermediary network devices.

Figure 6A:
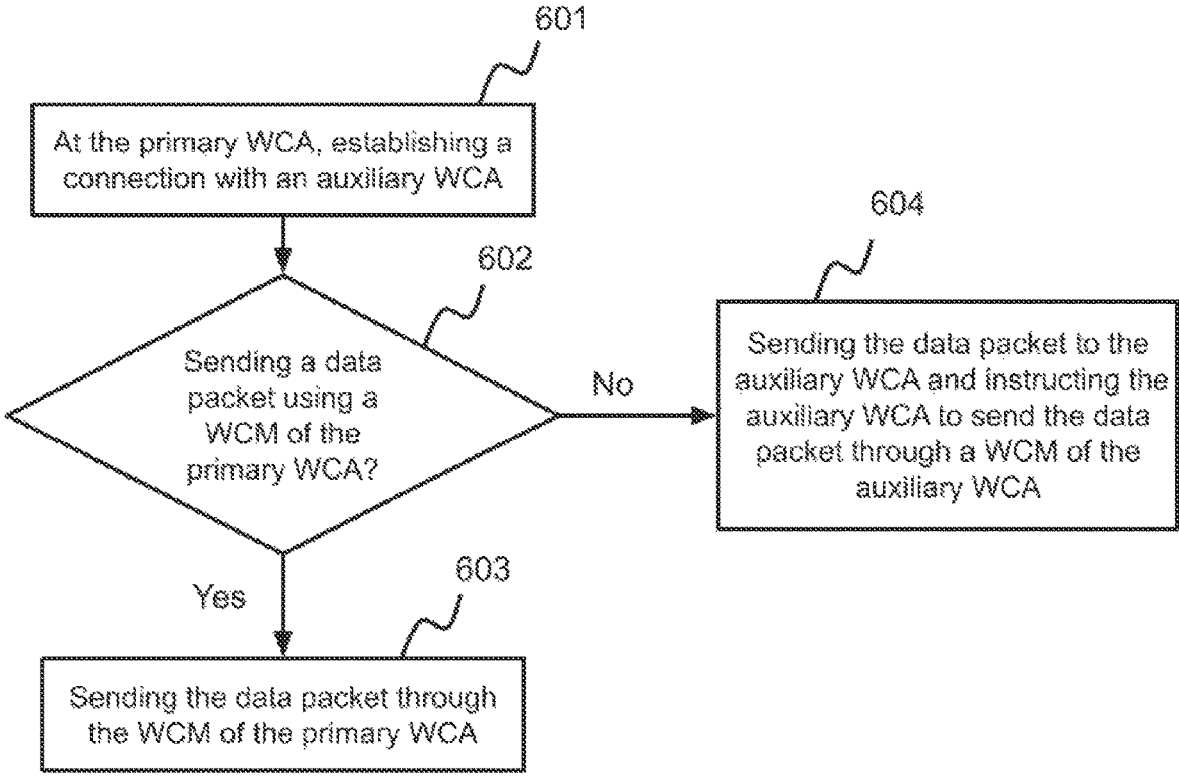
FIG. 6A is a process flowchart illustrating a method for sending data at a primary WCA in conjunction with an auxiliary WCA.

FIG. 6A is a process flowchart illustrating data transmission using a primary WCA in conjunction with an auxiliary WCA. For illustrative purposes, the primary WCA may be a mobile phone and the auxiliary WCA may be a phone case for housing the primary WCA, which is capable of performing data transmission as described in the present invention. There is no limitation that the primary WCA must be a mobile phone, the primary WCA may also be a laptop, a tablet, or other WCAs. The mobile phone is disclosed for illustration purposes only. Similarly, there is no limitation that the auxiliary WCA must be a phone case. The auxiliary WCA may also be an external device connected to the primary WCA through a wired or wireless connection.

For illustration purposes, the processes disclosed in FIG. 6A may be performed by a processing unit of the primary WCA. In one variant, part or all of the processes disclosed in the present invention may also be performed by a processing unit of the auxiliary WCA. The primary WCA may be primary WCA 200 and the auxiliary WCA may be auxiliary WCA 220 as shown in FIG. 1A and FIG. 1B respectively. The primary WCA and the auxiliary WCA may include any combination of hardware elements as shown in FIGS. 2A-2E.

In process 601, processing unit 201 of primary WCA 200 establishes at least one connection with auxiliary WCA through at least one interface of primary WCA 200 and at least one interface of auxiliary WCA 220. For illustration purposes, the connection may be established using NFC technology. There is no limitation that the connection must be established using NFC, the connection may also be established using other technologies or protocols, such as Wi-Fi, Bluetooth, RFID, LoRa, Infrared, Microwave radio, recommended standard 232 (RS-232), USB, and USB type C to lightning cable. There is also no limitation that the connection must be a wireless connection, the connection may also be a wired connection. In one example, the connection may be established between interface 206 of primary WCA 200 and interface 226 of auxiliary WCA 220 using a USB type C to lightning cable. In another example, the connection may be established using a cable consisting of at least four wires.

The connection between primary WCA 200 and auxiliary WCA 220 may be established when a first event occurs. For example, at least one connection between primary WCA 200 and auxiliary WCA 220 may be established when primary WCA 200 and auxiliary WCA 220 are powered on, placed in a near-field area, connected to the same LAN, or about to send and/or receive data. In one variant, the connection may be established manually by a user of primary WCA 200 and auxiliary WCA 220 by controlling the data communication interfaces of primary WCA 200 and auxiliary WCA 220. For example, a user may tune the data communication interfaces of primary WCA 200 and auxiliary WCA 220 to be on the same frequency band or data channel. In one variant, the processing unit of auxiliary WCA 220 continuously monitors to determine whether an event is in progress or has occurred. When the event is in progress or has occurred, the processing unit of auxiliary WCA 220 may send a notification to primary WCA 200. Based on the notification, the processing unit of primary WCA 220 may initiate process 601. In one variant, when the event is in progress or has occurred, the processing unit of auxiliary WCA 220 may send a signal or an instruction to primary WCA 200 for performing process 601 and subsequent processes.

In process 602, processing unit 201 of primary WCA 200 determines whether to send a data packet using primary WCA 200 or auxiliary WCA 220. When a decision is made to send the data packet using primary WCA 200, in process 603, processing unit 201 of primary WCA 200 sends the data packet through a first WCM of primary WCA 200, such as through WCM 203. On the other hand, if a decision is made not to send the data packet using primary WCA 200, "No" branch of the flowchart is followed and process 604 is performed. In process 604, processing unit 201 of primary WCA 200 instructs auxiliary WCA 220 to send the data packet using a WCM of auxiliary WCA 220, for example, to send the data packet using WCM 223. There is no limitation on the source of the data packet. For example, the data packet may have initially originated from a first application of primary WCA 200.

Figure 6B:
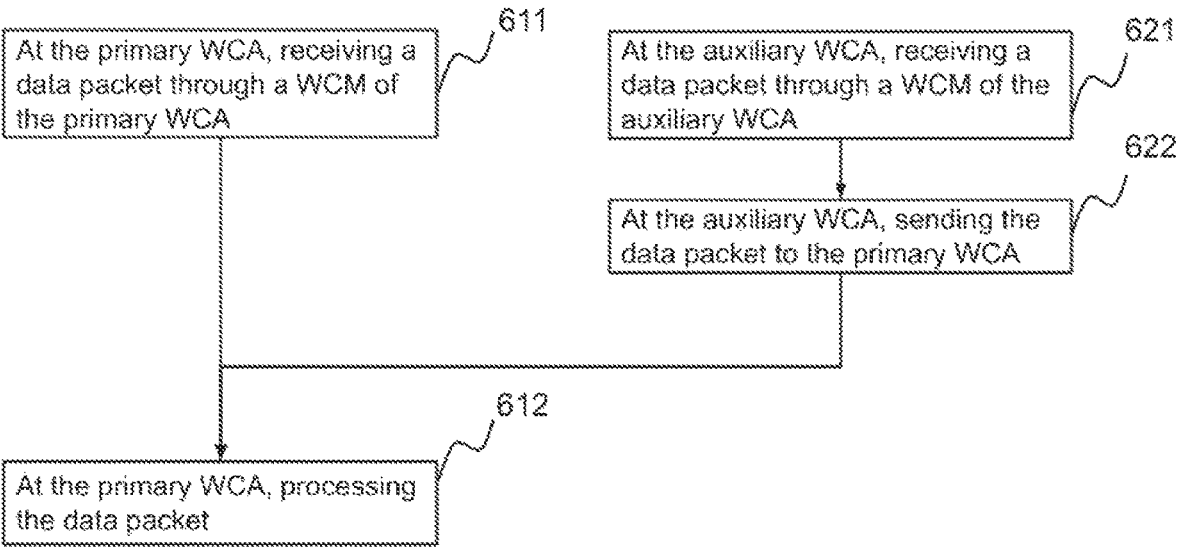
FIG. 6B is a process flowchart illustrating the processing of received data at a primary WCA in conjunction with an auxiliary WCA.

FIG. 6B is a process flowchart illustrating the processing of received data at a primary WCA in conjunction with an auxiliary WCA. The primary WCA may be a mobile phone and the auxiliary WCA may be a phone case capable of performing as a cellular router as described in the present invention. The mobile phone is disclosed for illustration purposes only. The primary WCA may also be a laptop, a tablet, or other WCAs. There is no limitation that the primary WCA must be a mobile phone. Similarly, there is no limitation that the auxiliary WCA must be a mobile phone case. The auxiliary WCA may also be an external device connected to the primary WCA through a wired or wireless connection.

For illustration purposes, the processes disclosed in FIG. 6B may be performed by a processing unit of the primary WCA. In one variant, part or all of the processes disclosed in FIG. 6B may also be performed by a processing unit of the auxiliary WCA. The primary WCA may be primary WCA 200 and the auxiliary WCA may be auxiliary WCA 220 as shown in FIG. 1A and FIG. 1B respectively. The primary WCA and the auxiliary WCA may include any combination of hardware elements as shown in FIGS. 2A-2E.

In one exemplary scenario, processing unit 201 of primary WCA 200 receives a data packet through WCM 203 in process 611. The data packet may be received through the connection established with auxiliary WCA 220 disclosed in FIG. 6A or the data packet may be received through another connection established with another WCA or a different apparatus. When the data packet is received through the connection established with auxiliary WCA 220, the data packet may be initially received by auxiliary WCA 220 from another WCA or a network node and then forwarded to primary WCA 200. In one variant, the data packet may be originated from auxiliary WCA 220. There is no limitation on the source or the origin of the data packet. Similarly, there is no limitation on the session of the data packet. The data packet may be the first data packet of a data session. The data packet may be the second, third or fourth data packet of the data session. In one variant, the data packet is the only data packet of a data session.

In process 612, processing unit 201 of primary WCA 200 processes the data packet. The data packet may be processed according to the instructions contained in the data packet. In one variant, the data packet may be processed according to the instructions contained in a different data packet belonging to the same data session of the data packet. In another variant, the instructions to process the data packet are pre-stored at a storage unit of primary WCA 200. Hence, when the data packet is received, processing unit 201 retrieves the instructions for processing the data packet from the storage unit and then processes the data packet according to the instructions.

In another exemplary scenario, as shown in process 621, the data packet has been received through a WCM of the auxiliary WCA. For example, the data packet may be received through WCM 223 of auxiliary WCA 220. In process 622, processing unit 225 of auxiliary WCA 220 sends the data packet to primary WCA 200. After that, process 612 is performed to process the data packet at the primary WCA as described earlier.

In another variant, after receiving the data packet at auxiliary WCA 220, processing unit 225 of auxiliary WCA 220 may perform a determination process (not shown) to decide whether the data packet is destined for primary WCA 200 or auxiliary WCA 220. Auxiliary WCA 220 performs process 622 when the data packet is destined for primary WCA 200. On the contrary, processing unit 225 of auxiliary WCA 220 processes the data packet when the data packet is destined for auxiliary WCA 220.

In another variant, after receiving the data packet at auxiliary WCA 220, processing unit 225 of auxiliary WCA 220 determines whether the data packet is the first packet of a new data session. When the data packet is the first data packet of the new data session, auxiliary WCA 220 informs primary WCA 200 regarding the arrival of the first data packet of the new data session and requests instructions for processing the data packets of the new data session. Responsive to the request from auxiliary WCA 220, primary WCA 200 may analyze the data packet and the session related information and instructs auxiliary WCA 220 whether to send the data packets of the data session to primary WCA 200 or process the packets of the new data session at auxiliary WCA 220.

When primary WCA 200 instructs auxiliary WCA 220 to send all the data packets of the new data session to primary WCA 200, auxiliary WCA 220 sends the data packet and stores the instructions of primary WCA 200 regarding the new data session. Storing the instructions may reduce the processing load of processing unit 225 of auxiliary WCA 220, as when a subsequent data packet of the same data session will be received at auxiliary WCA 220, processing unit 225 of auxiliary WCA 220 may send the data packet to primary WCA 200 according to the pre-stored instructions.

There is no limitation that a single data packet is received at a time. A plurality of data packets may also be received simultaneously. As such, when a plurality of data packets are received, WCM 203 of primary WCA 200 and WCM 223 of auxiliary WCA 220 may receive data packets simultaneously, for example, process 611 and process 621 may occur at the same time. When a plurality of data packets are received at the same time, the data packets should be processed in the same method as disclosed. However, when a vast amount of data packets are received simultaneously by the WCMs 203 and 223, the processing load of the processing unit of primary WCA 200 may become elevated to a higher rate than the normal processing rate of the processing unit. In such instances, the processing unit may become prone to malfunction for a variety of reasons. Therefore, in one variant, the processing units of primary WCA 200 and auxiliary WCA 220 are configured in a manner so that the processing unit becomes capable of sharing the processing loads.

The term processing a data packet may refer to decoding the data packet, reading the information composed in the data packet, and acting upon the information of the data packet. In one example, maybe the data packet is to be used by a specific application of primary WCA 200, therefore, the data packet may be processed by performing the commands directed by the specific application. In another example, maybe the data packet is to be stored in a storage unit of primary WCA 200, therefore, the data packet may be processed by storing it in the storage unit. One skilled in the art would appreciate that there are myriads of ways of processing a data packet.

Figure 7A:
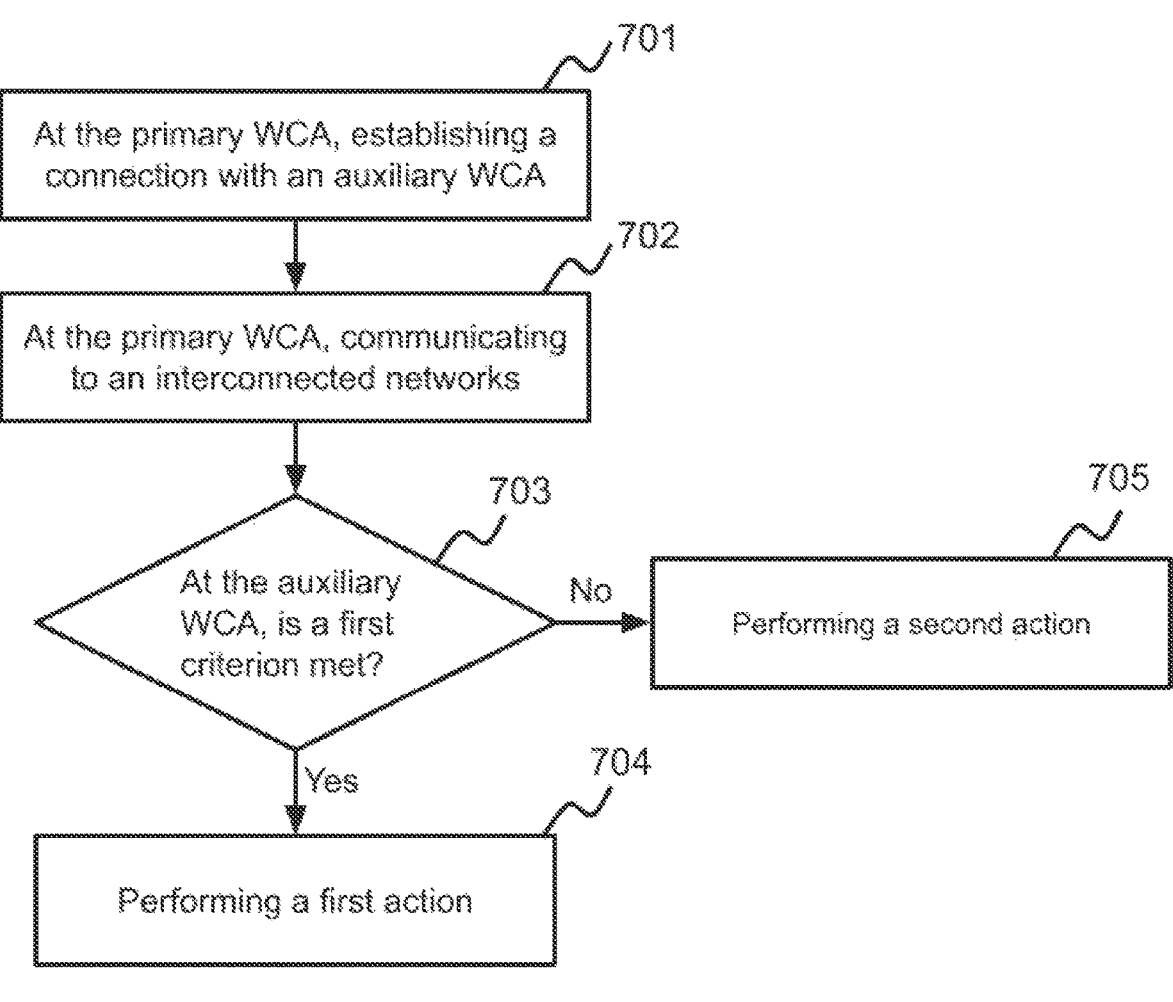
FIG. 7A is a process flowchart illustrating a method, initiated by either a primary WCA, an auxiliary WCA, or both, for performing a specified action based on criteria.

FIG. 7A is a flowchart illustrating a method for performing a specified action based on criteria. The processes disclosed in FIG. 7A may be performed by a processing unit of a primary WCA, a processing unit of an auxiliary WCA, or both of the processing units of the primary WCA and the auxiliary WCA. In process 701, at the primary WCA, such as primary WCA 100, a connection is established with an auxiliary WCA, such as auxiliary WCA 120. The primary WCA may perform data communication through a WAN connection with interconnected networks in process 702. There is no limitation that process 702 must be performed after process 701. Thus, the primary WCA is capable of establishing a WAN connection (e.g. connection to interconnected networks) before process 701. The use of auxiliary WCA allows a system to perform activities or monitor events that the primary WCA itself is not able to perform.

In one example, the primary WCA has a WAN connection established before process 701, therefore, after process 701, the primary WCA may establish additional WAN connections using at least one WCM of the auxiliary WCA. After a connection with the auxiliary WCA is established, the primary WCA is capable of communicating through the interconnected networks using one or more WCMs of the primary WCA and/or one or more WCMs of the auxiliary WCA.

In process 703, the processing unit of the auxiliary WCA will determine whether a first criterion is met. If the first criterion is met, then a first action is performed in process 704. Otherwise, a second action is performed in process 705. There is no limitation on the subject matter of the first criterion, any elements or conditions may be used as the first criterion. In one variant, in process 703, a determination is made to decide whether a first criteria is met where the first criteria is based on the different subject matters.

In one exemplary scenario, the first criterion is met if an ambient temperature is or above a predefined temperature and is not met if the ambient temperature is below the predefined temperature. For illustration purposes, the auxiliary WCA may be configured to monitor the ambient temperature. When the processing unit of the auxiliary WCA determines that the ambient temperature is below the predefined ambient temperature, then the auxiliary WCA will perform a first action, which may be to send an alert to a user. When the ambient temperature is not below the predefined ambient temperature, a second action will be performed where the second action may be to perform no action and/or to continue monitoring the ambient temperature.

In one variant, instead of a particular predefined ambient temperature, a range of ambient temperature is predefined to indicate a normal ambient temperature range. For example, the normal ambient temperature may range from 15 to 30 degrees Celsius. When the auxiliary WCA determines that the ambient temperature is below or above the normal ambient temperature range, then the auxiliary WCA will perform a first action, that is sending an alert to a user or a management server accessible to the user. In one variant, the first action may be to generate an alert only and not send it. In another variant, the first action is to send a message to the primary WCA. There is no limitation on the content of the message. In one example, the content of the message may be to instruct the primary WCA to reboot.

When the ambient temperature is not below or above the normal ambient temperature range, the second action will be performed that is performing no action and/or continuing monitoring the ambient temperature.

The alert may be sent by displaying a message on a display unit of the primary WCA, displaying a message on a display unit connected to the auxiliary WCA, playing a certain tone at the primary WCA, vibrating the primary WCA or the auxiliary WCA, running a light code, changing the light color of a display unit, sending an email to a certain email address, making a phone call to a certain number, sending a message to another application or any other notification techniques. In one variant, a plurality of notification techniques is used together for alerting the user in order to increase the chance of the reception of the alert message by the user.

In another exemplary scenario, the ambient temperature may be monitored by at least one temperature sensor. The temperature sensors may be connected with the auxiliary WCA over the interconnected networks as discussed in process 702. The temperature sensors may send the ambient temperature information to the auxiliary WCA at a certain time interval. The time interval to send the ambient temperature information by the temperature sensors may be set by default or manually by an administrator. When the ambient temperature information is received, the auxiliary WCA may determine whether a first criterion is met based on the predefined ambient temperature or a predefined range of ambient temperature as disclosed earlier.

In one variant, when the ambient temperature information is received by the auxiliary WCA, the auxiliary WCA forwards the ambient temperature information to the primary WCA. Then the primary WCA determines whether a first criterion is met based on the predefined ambient temperature or a predefined range of ambient temperature and subsequently performs the first action or the second action as disclosed earlier.

In another variant, the auxiliary WCA may store ambient temperature information and does not send the ambient temperature information to the primary WCA as soon as the auxiliary WCA receives the ambient temperature information. The auxiliary WCA may store the ambient temperature information in a storage unit connected with the auxiliary WCA, such as storage unit 228 shown in FIG. 2B. The auxiliary WCA may send the ambient temperature information after the auxiliary WCA receives instruction from the primary WCA for sending the ambient temperature information. The instruction may be initiated by a user or generated by the processing unit of the primary WCA. Sending the ambient temperature information only after receiving an instruction from the primary WCA may reduce processing load and save power and other associated resources for both the primary and the auxiliary WCAs.

In another variant, a time interval is set by default or by a user for sending the ambient temperature information by the auxiliary WCA to the primary WCA. Therefore, the auxiliary WCA stores the ambient temperature information received from the temperature sensors during the time interval, then sends the stored ambient temperature information at the end of each time interval to the primary WCA. In another variant, the auxiliary WCA may store the ambient temperature information received from the temperature sensors in a database that is accessible by the primary WCA, then at a certain time, the primary WCA may access the database to receive the ambient temperature information. The benefit of storing the ambient temperature information may facilitate saving the storage space of the auxiliary WCA or the primary WCA. Also, the primary WCA may access and analyze historical ambient temperature information when necessary. In another variant, the temperature sensors may store the ambient temperature information directly in the database, the primary WCA may receive the ambient temperature information by accessing the database without the auxiliary WCA.

It should be noted that the auxiliary WCA and/or the primary WCA may be connected with various types of IoT devices. The temperature sensors are disclosed only for illustration purposes. As such, the information sent by the IoT devices is not limited to temperature information. For example, the information sent by the IoT devices may include, but is not limited to, audio information (e.g. recorded voice or sounds), statistical information (e.g. measurements of different subject matters), and graphical information (e.g. graphs, charts, images, and videos).

There is no limitation that processes 703-705 must be performed at the auxiliary WCA. In one variant, processes 703-705 may be performed at the primary WCA. In another exemplary scenario, the first criterion may be the status or the condition of a component of the primary WCA, such as the computation power of the processing unit of the primary WCA, the amount of free memory of the primary WCA, and/or the availability of at least one WCM of the primary WCA. If the status or the condition of a component of the primary WCA cannot reach a threshold, then the same component of the auxiliary WCA may work concurrently with the component of the primary WCA. In one example, the first criterion may be met when all the WCMs of the primary WCA are in use. Therefore, when the first criterion is met, in process 704 a first action is performed. The first action may be to use a WCM of the auxiliary WCA for establishing a subsequent connection. The auxiliary WCA may house or be connected to a plurality of WCMs. However, if the first criterion is not met, indicating all the WCMs of primary WCA are not in use, the second action is performed in process 705. The second action may be to use a WCM of the primary WCA for establishing a subsequent connection.

In another example, in process 703, a determination is made to decide whether the processing unit of the primary WCA is operating above a threshold processing rate. When the processing unit of the primary WCA is operating above the threshold processing rate, the first criterion may be met. Therefore, in process 704, the first action may be to use the processing unit of the auxiliary WCA as a coprocessor of the primary WCA. However, if the first criterion is not met, indicating the processing unit of the primary WCA is not operating over a threshold processing rate, the second action is performed in process 705. The second action may be performing no action or continuing to monitor the processing rate.

In another exemplary scenario, the first criterion is met when the primary WCA is operating at an expected performance ratio. The expected performance ratio may be calculated based on one or more network performance criteria, such as packet delay, bandwidth, throughput, packet loss, packet drop, power consumption, signal-to-noise ratio (SNR), round trip time, interference level, error rate, quality of service, queuing delay and packet jitter.

Therefore, when the first criterion is met, the processing unit of the primary WCA will perform the first action in process 704. For this exemplary scenario, the first action may be to continue data communication or perform no action.

However, when the primary WCA is not operating at an expected performance ratio, a second action will be performed in process 705. The second action may include sending an alert to a server, sending an alert to a user or an administrator, rebooting the auxiliary WCA, starting receiving power from the auxiliary WCA, stopping receiving power from the auxiliary WCA, and/or playing a certain tone to signal an alarm.

In another exemplary scenario, the primary WCA may stop working or certain functions may be temporarily postponed because of low power, thus, the expected performance ratio will not be satisfied. Therefore, the second action will be performed. In this case, the second action may be to instruct the auxiliary WCA for providing backup power and when the auxiliary WCA will start providing backup power the primary WCA will receive the power. There is no limitation on the combinations and variations of the utilization of the first and second actions based on criteria. In one variant, the first action may be performed when the first criterion is not met and the second action may be performed when the first criterion is met.

Figure 7B:
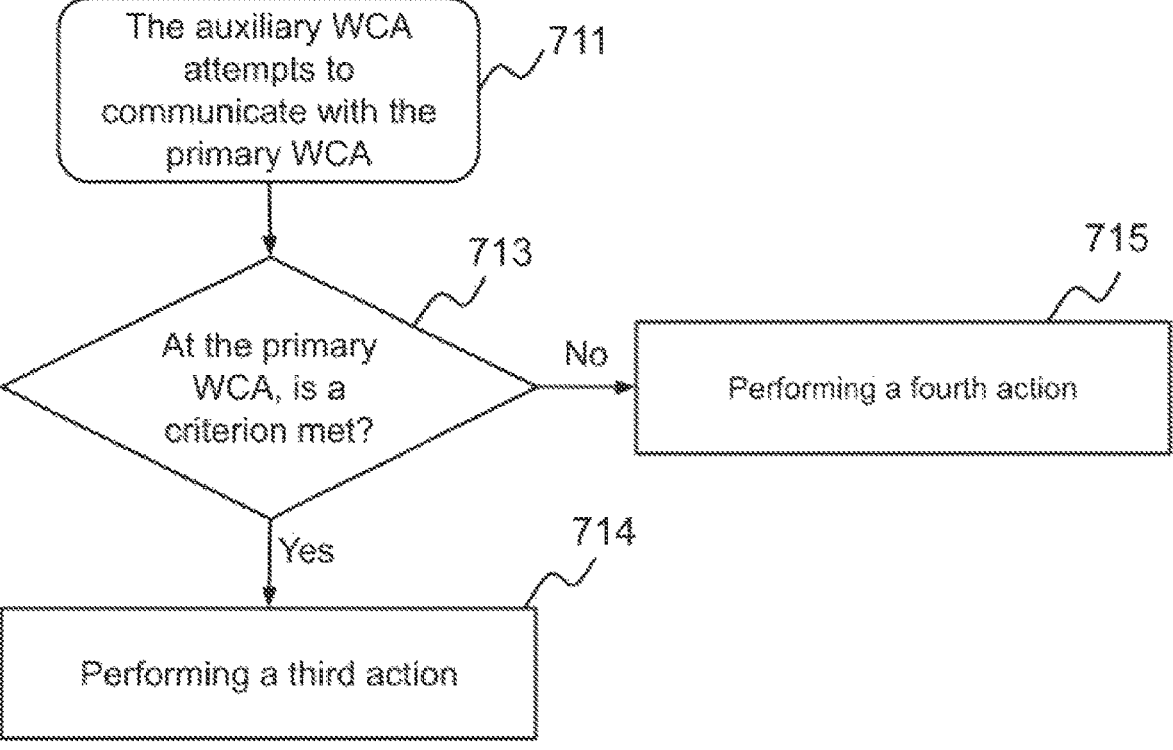
FIG. 7B is a process flowchart illustrating a method, initiated by an auxiliary WCA only, for performing a specified action based on criteria.

FIG. 7B is a flowchart illustrating a method for performing a specified action based on criteria. The processes disclosed in FIG. 7B are performed by a processing unit of an auxiliary WCA. In FIG. 7A the process can be initiated from either the primary WCA, the auxiliary WCA, or from both, whereas in FIG. 7B the process is initiated from the auxiliary WCA only. In process 711, the auxiliary WCA, such as auxiliary WCA 120, attempts to communicate with a primary WCA, such as primary WCA 100. The attempt to establish the connection may be implemented by sending a request message to the primary WCA. For illustration purposes, the attempt may fail, including but not limited to, that a connection cannot be established for data packets to be transmitted via wired connection, the primary WCA is out of range in the case of wireless connections, the primary WCA or the auxiliary WCA is out of power.

In process 713, when the processing unit of the primary WCA receives the request message for connection will determine whether a criterion is met. If the criterion is met, then a third action is performed in process 714. Otherwise, a fourth action is performed in process 715. In one variant, in process 713, whether a criterion is met is determined by whether a response is received by the auxiliary WCA before time lapses.

In one exemplary scenario, a criterion is met if a response is not received before the time lapse. For illustration purposes, the auxiliary WCA may be configured to monitor the time required for receiving a response from a primary WCA. When the processing unit of the auxiliary WCA determines that the time required to receive a response from a primary WCA has lapsed, then the auxiliary WCA will perform a third action. The third action may be to send out an alert to notify the user that a primary WCA is not responding.

Comparing process 704 and process 714, process 704 may be performed by the processing unit of the primary or auxiliary WCA, however, process 714 is performed by the processing unit of the auxiliary WCA. Comparing process 705 and process 715, process 705 may be performed by the processing unit of the primary or auxiliary WCA, however, process 715 is performed by the processing unit of the auxiliary WCA.

When the processing unit of the auxiliary WCA receives a response from a primary WCA before the time lapses, the criterion in process 713 is not met and the auxiliary WCA will perform a fourth action. In one variant, there is no limitation that auxiliary WCA must perform an action. For example, the processing unit of the auxiliary WCA may not perform any specific action if the response is received before the time lapses.

In another exemplary scenario, a criterion is met if a connection from an auxiliary WCA cannot be successfully established with a primary WCA. For illustration purposes, the primary WCA may be out of order that it cannot receive requests nor respond to requests. When the processing unit of the auxiliary WCA determines a criterion is met at process 713, the auxiliary WCA will perform a third action. It may be to send out an alert to notify the user that a connection with the primary WCA cannot be established.

Figure 8A:
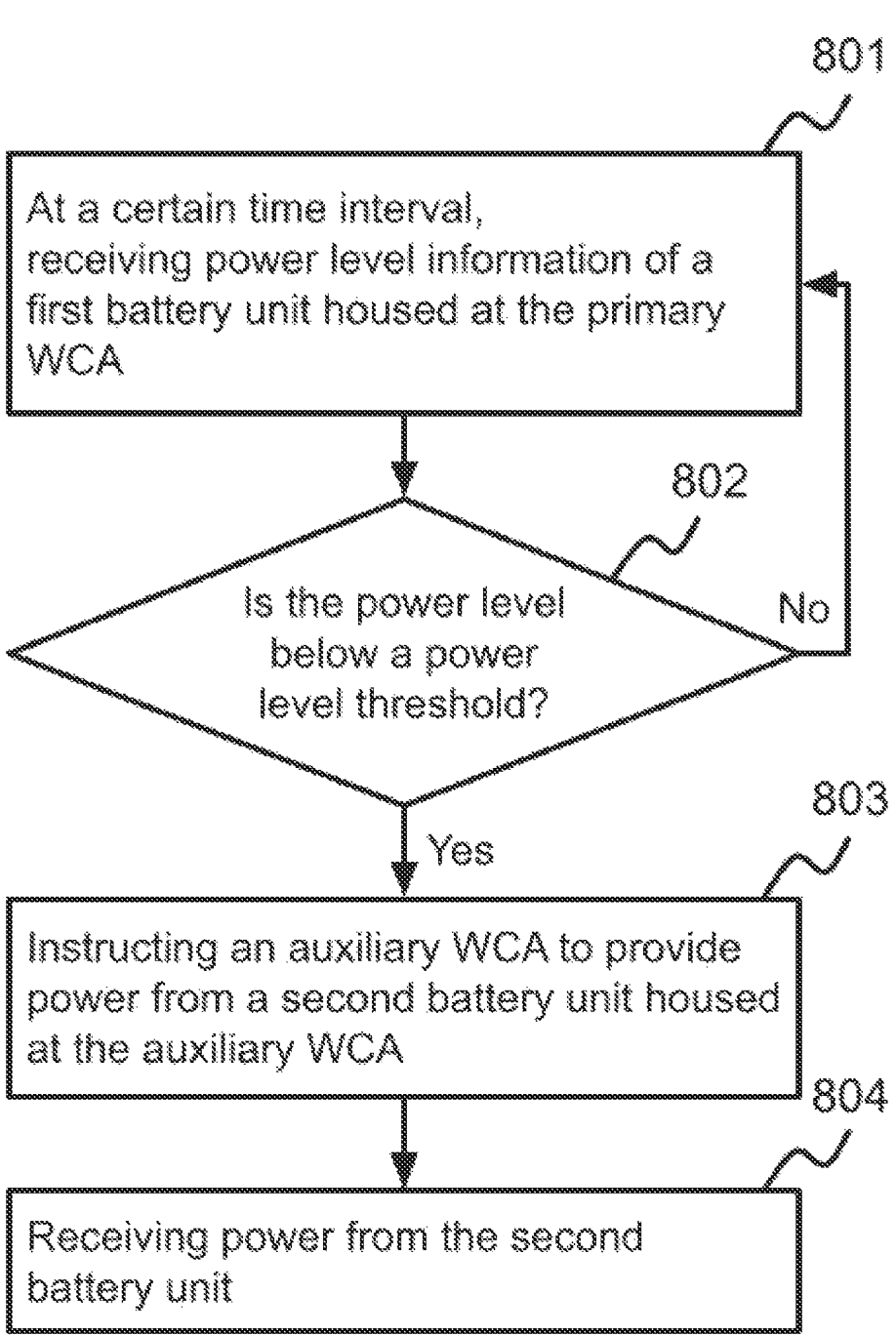
FIG. 8A is a process flowchart illustrating a method for receiving backup power at a primary WCA.

FIG. 8A is a flowchart illustrating a method for receiving backup power at the primary WCA. The primary WCA may have established a connection with the auxiliary WCA as disclosed earlier. The primary WCA may comprise a first battery unit and the auxiliary WCA may comprise a second battery unit. For illustration purposes, as shown in FIG. 2B, the first battery unit may be battery unit 207 and the second battery unit may be battery unit 231.

In process 801, the processing unit of the primary WCA receives power level information from the first battery unit. In one variant, the power level information may be received from a power measurement unit at a certain time interval. The power measurement unit may be connected with the processing unit and the first battery unit. In another variant, the processing unit of the primary WCA reads the power level information of the first battery unit by itself at a certain time interval.

In process 802, the processing unit of the primary WCA determines whether the power level of the first battery unit is below a power level threshold. The power level threshold may be set by default by the manufacturer or by a user of the primary WCA.

In another variant, the power measurement unit reads the power level information of the first battery unit at a certain time interval, however, only sends the power level information to the primary WCA when the power level is below a certain power level threshold, i.e. the decision of process 802 is performed at the power measurement unit.

When the power level of the first battery unit is below the power level threshold, in process 803, the processing unit of the primary WCA sends an instruction to the WCA to supply backup power.

In process 804, the primary WCA receives backup power from the auxiliary WCA responsive to the instruction for backup power. The auxiliary WCA is configurable to provide backup power from the second battery unit to the primary WCA.

In an alternative scenario, instead of receiving backup power, the primary WCA may receive a message from the auxiliary WCA regarding the insufficient power level of the second battery unit.

Figure 8B:
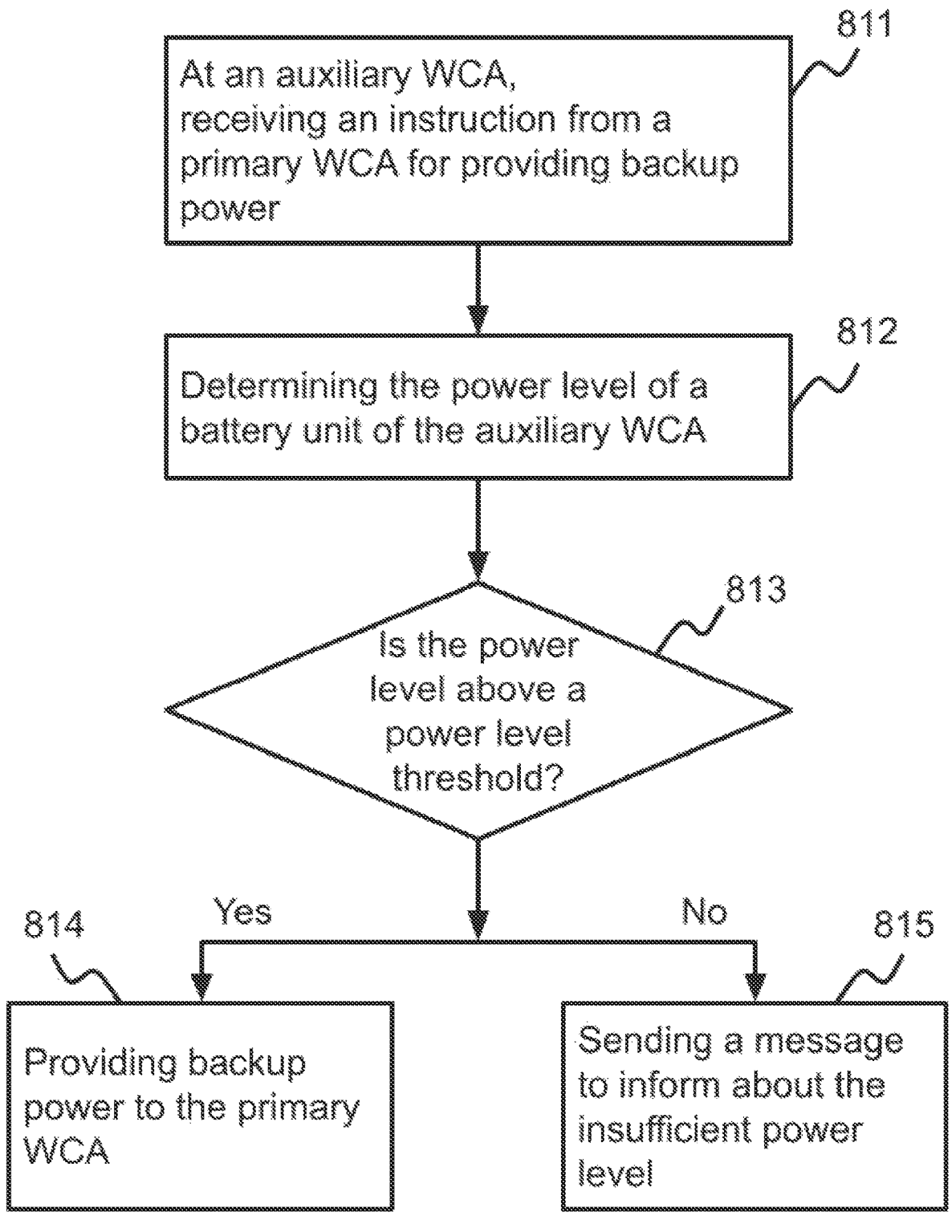
FIG. 8B is a process flowchart illustrating a method for providing backup power to a primary WCA from an auxiliary WCA.

FIG. 8B is a flowchart illustrating a method for providing backup power to a primary WCA. The primary WCA may have established a connection with an auxiliary WCA as disclosed earlier. The primary WCA may comprise a first battery unit, such as battery unit 207 and the auxiliary WCA may comprise a second battery unit, such as battery unit 231 shown in FIG. 2B.

In process 811, the processing unit of the auxiliary WCA receives instruction from the primary WCA for providing backup power. The processing unit of the primary WCA may send the instruction for backup power in process 803 as discussed in FIG. 8A.

In process 812, the processing unit of the auxiliary WCA determines whether the power level of the second battery unit is above a power level threshold.

In process 814, if the power level of the second battery unit is above the power level threshold, the processing unit of the auxiliary WCA allows the primary WCA to receive backup power from the second battery unit. On the contrary, if the power level of the second battery unit is below the power level threshold, in process 815, the auxiliary WCA may send a message to the primary WCA to inform about the insufficient power level of the second battery unit.

In response to the message of insufficient power level, the primary WCA may notify the user that all the battery units are charged out. Those skilled in the art would understand that there are myriads of techniques for notifying a user. There is no limitation on the techniques for sending the notification. For example, the user may be notified by displaying a message on a display unit, playing a specific audio tone, sending an email, displaying a specific symbol, vibrating the primary WCA, launching a specific light code, or using a combination of techniques.

In one variant, the processes disclosed in FIGS. 8A and 8B are performed by the processing unit of the primary WCA and the auxiliary WCA doesn't comprise any processing unit. In that case, processes 803 and 811 may be omitted and process 815 may be performed by the processing unit of the primary WCA to send the message to a user, or the message may be displayed on a display unit.

FIG. 9 illustrates a method for receiving information of available SIMs from an auxiliary WCA at a primary WCA, and selecting a plurality of SIMs for data communication. The processes illustrated in FIG. 9 may be performed by a processing unit of the primary WCA. The auxiliary WCA may comprise a first plurality of SIMs. The plurality of SIMs may include removable SIMs realized by UICCs and/or eUICCs. Since in the present invention, one of the objectives is to use the auxiliary WCA as a mobile phone case capable of performing as a cellular router, it is preferable that the first plurality of SIMs includes eSIMs. Using eSIMs may reduce the equipment loads of the auxiliary WCA while enabling it to store a large number of SIMs and also giving the flexibility to change the SIMs on users' demands.

In process 901, the processing unit of the primary WCA establishes at least one connection with the auxiliary WCA. The connection may be established as disclosed in process 601 of FIG. 6A.

In process 902, the processing unit of the primary WCA sends a request to the auxiliary WCA for information on available SIMs at the auxiliary WCA. An available SIM may refer to a SIM that is active and configurable to be used for establishing data connections.

Responsive to the request, in process 903, information of the first plurality of SIMs is received at the primary WCA. The information of the first plurality of SIMs may be sent by the auxiliary WCA. The information of the first plurality of SIMs may include IMEI, eUICC ID, SIM profile ID, and other associated information.

In process 904, the processing unit of the primary WCA selects a second plurality of SIMs to be used for data communication from the first plurality of SIMs.

In process 905, when a data packet or a group of data packets is/are to be sent, the processing unit of the primary WCA may use the second plurality of SIMs. Since the objective of the present invention is to enable the primary WCA to achieve high speed data communication, therefore, it is preferable to use a plurality of SIMs simultaneously. When a plurality of SIMs are used at the same time, all of the plurality of SIMs may be used to establish data connections simultaneously and then the data connections may be aggregated together by the auxiliary WCA to achieve higher speed in data communication. It is already disclosed earlier how data communication is performed by the primary WCA in conjunction with the auxiliary WCA. The processing unit of the primary WCA may need to send the data packet(s) when it receives an instruction from an application installed in the primary WCA. There is no limitation about when and how many data packets are to be sent by the primary WCA.

Those skilled in the art will readily recognize that various modifications of the present invention may be made. Accordingly, the embodiment illustrated and discussed herein should be understood to be exemplary only in nature and the scope of the instant invention should be limited only by that of the following claims.

The invention claimed is:

1. A method of providing wireless communication at a primary wireless communication apparatus (WCA) in conjunction with an auxiliary WCA, comprising:
   - (a) at the primary WCA, establishing at least one connection with the auxiliary WCA;
   - (b) at the primary WCA, establishing a plurality of virtual private network (VPN) tunnels with a node via the auxiliary WCA and communicating to the node through an interconnected network via the auxiliary WCA;
   - (c) at the auxiliary WCA, determining whether a first criterion is met;
   - (d) at the auxiliary WCA, performing a first action when the first criterion is met; and
   - (e) at the auxiliary WCA, performing a second action when the first criterion is not met;
   wherein the first criterion is not determined based on cellular signal strength; and
   wherein steps (c) and (d) are performed by the auxiliary WCA after step (a) is performed by the primary WCA.

2. The method of claim 1, wherein the auxiliary WCA is configured to provide backup power to the primary WCA.

3. The method of claim 1, wherein the first action is to generate an alert and the second action is to continuously monitor ambient temperature.

4. The method of claim 1, wherein the first action is to send a message by the auxiliary WCA to the primary WCA and the second action is to continuously monitor the ambient temperature.

5. The method of claim 4, wherein the message comprises instructions to reboot the primary WCA.

6. The method of claim 1, wherein the first action is to let a processing unit of the auxiliary WCA act as a coprocessor of a processing unit of the primary WCA and the second action is to continue monitoring processing rate.

7. The method of claim 1, wherein the first criterion is computation power of a processing unit of the primary WCA.

8. The method of claim 1, wherein the first criterion is successfully sending data packet through at least one wireless communication module (WCM) of the primary WCA.

9. The method of claim 1, wherein the primary WCA and the auxiliary WCA are connected through a cable and the cable comprises at least four wires.

10. The method of claim 1, wherein the primary WCA comprises at least one interface selected from one or more of the following: wireless interface, Universal Serial Bus (USB) interface, and RS-232 interface.

11. A system for providing wireless communication at a primary wireless communication apparatus (WCA) in conjunction with an auxiliary WCA, comprising:
   the primary WCA; and
   the auxiliary WCA;
   wherein the primary WCA comprises:
   - at least one first processing unit;
   - at least one first subscriber identification module (SIM) interface;
   - at least one first wireless communication module (WCM); and
   - at least one first non-transitory computer readable storage medium storing program instructions executable by the at least one first processing unit for:
     - (a) establishing at least one connection with the auxiliary WCA; and
     - (b) establishing a plurality of virtual private network (VPN) tunnels with a node via the auxiliary WCA and communicating to the node through an interconnected network via the auxiliary WCA;
   wherein the auxiliary WCA comprises:
   - at least one second processing unit;
   - at least one second SIM interface;
   - at least one second WCM; and
   - at least one second non-transitory computer readable storage medium storing program instructions executable by the at least one second processing unit for:
     - (c) determining whether a first criterion is met;
     - (d) performing a first action when the first criterion is met; and
     - (e) performing a second action when the first criterion is not met;
   wherein the first criterion is not related to cellular signal strength; and
   wherein steps (c) and (d) are performed by the auxiliary WCA after step (a) is performed by the primary WCA.

12. The system of claim 11, wherein the auxiliary WCA is configured to provide backup power to the primary WCA.

13. The system of claim 11, wherein the first action is to generate an alert and the second action is to continuously monitor ambient temperature.

14. The system of claim 11, wherein the first action is to send a message by the auxiliary WCA to the primary WCA and the second action is to continuously monitor the ambient temperature.

15. The system of claim 11, wherein the message comprises instructions to reboot the primary WCA.

16. The system of claim 11, wherein the first action is to let the at least one second processing unit act as a coprocessor of the at least one first processing unit.

17. The system of claim 11, wherein the first criterion is computation power of the at least one first processing unit.

18. The system of claim 11, wherein the first criterion is successfully sending data packet through the at least one first WCM.

19. The system of claim 11, wherein the primary WCA and the auxiliary WCA are connected through a cable and the cable comprises at least four wires.

20. The system of claim 11, wherein the primary WCA comprises at least one interface selected from one or more of the following: wireless interface, Universal Serial Bus (USB) interface, and RS-232 interface.

\* \* \* \* \*